United States Patent Office
3,704,296
Patented Nov. 28, 1972

3,704,296
SUBSTITUTED THIAZOLIDINE-4-ONES
Max J. Mousseron, Montpellier, France, assignor to Etablissements Clin-Byla, Paris, France
No Drawing. Continuation-in-part of application Ser. No. 733,808, June 3, 1968, now Patent No. 3,678,041, dated July 18, 1972. This application May 25, 1971, Ser. No. 146,832
Claims priority, application France, June 6, 1967, 109,263
Int. Cl. C07d 91/14
U.S. Cl. 260—240 A     3 Claims

ABSTRACT OF THE DISCLOSURE

Highly active antibacterials are described which are 5-substituted thiazolidine-4-ones having formula

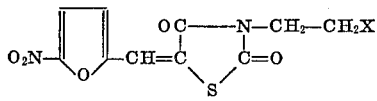

in which X is Cl or Br. Tests are described in which activity against a large number of gram positive and gram negative bacteria are reported.

---

This application is a continuation-in-part of application, Ser. No. 733,808, filed June 3, 1968, now U.S. Pat. 3,678,041 granted July 18, 1972.

This invention relates to a new series of chemical compounds which have a high antibacterial activity against a large number of gram positive and gram negative bacteria and which also have significant antitubercular activity; they are also capable of inhibiting the growth of a large number of pathogenic fungi such as candida, epidermophyton and trichophyton. By reason of these properties, the products are therapeutically useful both in human medicine and in the veterinary field.

According to the present invention there is provided a 5-hubstituted thiazolidine-4-one having one of the general formulae

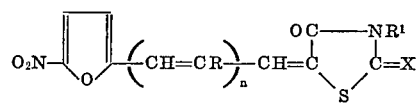

and

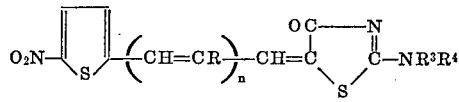

in which $n$ is 0 or 1, R is a hydrogen atom or a bromine atom, $R^2$ is a hydrogen atom, an alkyl, or alkenyl group which may be substituted by a halogen atom, or a hydroxyl, a carboxylic acid, carboxamide, substituted carboxhydrazide or carboxylic acid ester group or a primary, secondary or tertiary amino group, or $R^1$ is a carbalkoxy group, an alkynyl group, an azomethine group or a cycloalkyl, aryl or aralkyl group which cycloalkyl, aryl or aralkyl group may be substituted by one or more halogen atoms or hydroxyl, sulphonamido, nitro or carboxylic acid groups, X is an oxygen or sulphur atom or an imino group having the formula >$NR^2$ in which $R^2$ is a hydrogen atom or an alkyl, alkenyl, cycloalkyl, aryl, aralkyl or arylsulphonyl group which groups may be substituted, or a carbamido or amidinomethyl group and each of $R^3$ and $R^4$ is a hydrogen atom, or an alkyl, alkenyl, cycloalkyl, aryl or aralkyl group, which group may be substituted, or $R^3$ and $R^4$ together with the nitrogen atom to which they are attached form a heterocyclic ring, and salts of such thiazolidine-4-ones with acids and bases.

The compounds having the above general formula may contain a free carboxyl group in which case they form salts with mineral and organic bases such as the alkali metal bases, ammonia and amines. On the other hand they may contain primary, secondary and tertiary amino groups in which case they form salts with mineral and organic acids, especially with pharmaceutically acceptable mineral and organic acids, e.g. the hydrochlorides.

According to a feature of the invention the 5-substituted thiazolidine-4-ones having the above general formulae may be produced by a process which comprises reacting a 5-nitrofuran aldehyde having the general formula

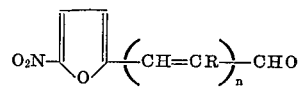

in which $n$ and R are as above defined, with a thiazolidine-4-one having one of the general formulae

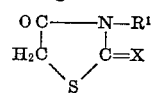

and

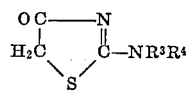

in which X, $R^1$, $R^3$ and $R^4$ are as above defined, in the presence of a dehydrating agent.

The 5-nitrofuran aldehyde used is 5-nitofurfural, β-(5-nitrofuryl-2)acrolein or α-bromo-β-(5-nitrofuryl-2)-acrolein.

The thiazolidine-4-one employed may or may not have a substituent present in the 3-position. When there is no substituent in the 3-position the condensation product, which corresponds to the following formula:

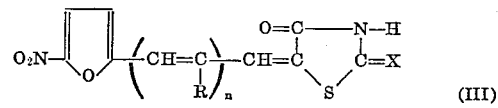

(III)

may be reacted, with one or more compounds which act as a source of the substituent $R^1$.

As an example formaldehyde may be used for introducing a substituent $R^1$. When it is desired to produce a compound which liberates formaldehyde, this may be used alone with a view to hydroxymethylation, or together with a secondary amine when it is desired to carry out a Mannich reaction. Alternatively, one may start with a halogenated derivative $R^1$Hal, the symbol Hal denoting a halogen atom, and react this with an alkali metal derivative of the Compound III.

Rhodanine which has the following formula

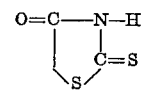

as well as most of its derivatives corresponding to the general formula

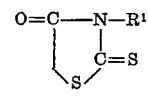

(IV)

in which $R^1$ is as defined above other than hydrogen, are already known. The remaining derivatives IV may be obtained by condensation of monochloroacetic acid with an alkali metal dithiocarbamate and subsequent closure of the lactam ring by heating in the presence of a strong mineral acid.

Condensation of a rhodanine IV with the nitrofuran aldehyde may be carried out in the presence of a dehydrating agent such as anhydrous sodium or potassium acetate in a single diluent (for example methanol, ethanol or acetic acid) or, more preferably, in a mixture of diluents (for example, a mixture of ethanol and acetic acid). The condensation is carried out by heating the reactants to between 60 and 100° C. for a time which is usually between 1 and 4 hours. The resulting products generally precipitate; they are isolated after cooling by the usual methods and may be recrystallised from solvents such as nitromethane and dimethylformamide.

If compounds having the general Formula III in which R=H, $n=0$ or 1 and X=S are treated with formaldehyde or trioxymethylene in solution in dimethylformamide and subjected to moderate heating, the corresponding hydroxymethyl derivatives I ($R^1=CH_2OH$) are obtained in good yields. The presence of a catalyst is not essential although traces of organic bases such as piperidine or morpholine may be added. The bond connecting the hydroxymethyl group to the nuclear nitrogen atom is not very stable and breaks on heating above 120° C., liberating the starting material. By treating compounds III (X=S) with the stoichimetrical quantities of formaldehyde (or trioxymethylene) and a secondary amine, for example, morpholine in suspension in ethanol or in solution in dimethylformamide, the corresponding Mannich base is formed even at room temperature.

Appropriately substituted thiazolidine-4-ones may also be obtained by treating rhodanine N-acetic acid ($R^1=-CH_2COOH$ in Formula IV) with thionyl chloride in solution in benzene and then reacting the resulting acid chloride with ammonia or with a secondary amine such as pyrrolidine or morpholine or with a hydrazide such as isonicotinic acid hydrazide.

3-amino-rhodanine ($R^1=NH_2$ in Formula IV) undergoes reaction with two molecules of the nitrofuran aldehyde, one reaction taking place at the 3-position with the formation of the hydrazone in a mixture of ethanol and mineral acid, whilst the other takes place at the 5-position by reason of an aldolisation reaction in acetic acid in the presence of an anhydrous alkali metal acetate.

The starting compound thiazolidine-4-one may also be a derivative of thiazolidine-2,4-dione

(V)

In this case, if $R^1$ is a substituent other than a hydrogen atom, this substituent may have been introduced into the thiazolidine-2,4-dione by means of one of its alkali metal salts, generally the potassium salt formed by treatment with potash in solution in ethanol at room temperature (the corresponding sodium salt is obtained in analogous manner or by means of sodium hydride). This salt is condensed with a halogen compound $R^1$Hal in which Hal is a halogen atom, preferably bromine or an iodine, in solution either in methanol or in ethanol under reflux or in dimethyl formamide under reflux if these halogens are relatively non-volatile. Derivatives in which $R^1$ is an alkyl group can be obtained by means of other alkylating agents, such as by the action of diazomethane (if $R^1=CH_3$) or by reaction with dialkylsulphates.

Condensation of the nitrofuran aldehydes is conveniently carried out by heating in solution in acetic acid in the presence of anhydrous sodium or potassium acetate at temperatures in the region of 100° C. until no further precipitation of the condensation product takes place. After prolonged cooling, the solid is isolated and recrystallized from a solvent which may be chosen from the following: methanol, ethanol, acetic acid, dioxane and dimethylformamide. The following reaction scheme illustrates the series of reactions enumerated above:

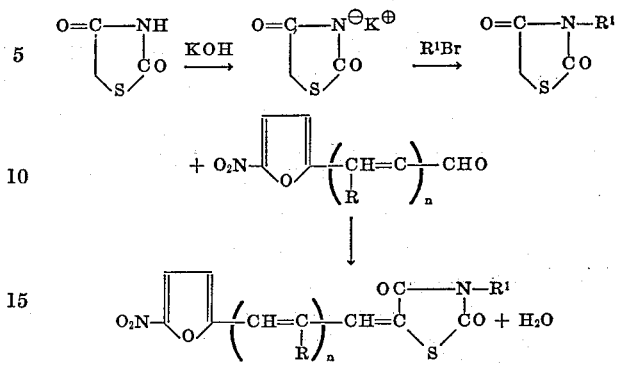

If, in the final product, it is desired that $R^1$ be other than hydrogen, it is sometimes preferable to condense a thiazolidine-2,4-dione which is unsubstituted in the 3-position with a nitrofuran aldehyde and to convert the product into an alkali metal derivative e.g. by means of an ethanol solution of sodium or potassium hydroxide at room temperature. The derivative thus obtained then reacts rapidly with a compound $R^1$Hal in which Hal is a halogen in solution in methanol under reflux or, even better, in dimethylformamide at about 100° C. After concentration of the solvent under reduced pressure and treatment with water, the products are obtained in very good yields.

Another process for obtaining the same products comprises hydrolysing the corresponding 2-imino-derivatives containing the substituent $R^1$ in the 3-position with a strong mineral acid for several hours at about 100° C. according to the following equation:

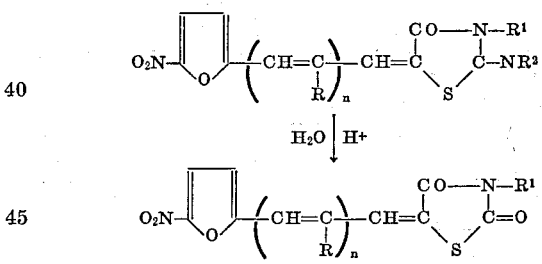

This method, however, does not always give satisfactory results because a substantial proportion of unreacted starting material may be present in the product.

As in the rhodanine series, the condensation products in which the 3-position is free are capable of yielding Mannich bases with aliphatic secondary amines such as dimethylamine, diethylamine and diethanolamine or cyclic amines such as pyrrolidine, piperidine, morpholine, piperazine or 4-($\beta$-hydroxy-ethyl)piperazine under the same conditions as their homologues. Suitable diluents are ethanol (the reaction taking place in a heterogeneous medium), dioxane or dimethylformamide. Treatment with formaldehyde also leads to the formation of derivatives which are hydroxymethylated in the 3-position, these products having the same instability when heated as the homologous derivatives of rhodanine; in effect, they lose one equivalent of formaldehyde at temperatures from 120° C. upwards.

The derivatives of 2-imino-thiazolide-4-one or pseudothiohydanation ($R^1=R^2=H$ in Formula VI)

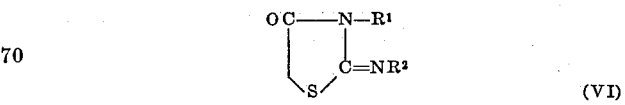

(VI)

have the same characteristic feature as the homologues which have just been described, namely nucleophilic reactivity of the methylene group in the 5-position, as a result of which they readily undergo the Knoevenagel reaction with the 5-nitrofuran aldehydes.

Compounds of the Formula VI above are generally obtained by the condensation of N,N'-disubstituted thioureas with monochloroacetic acid or with its methyl or ethyl ester. If on the other hand, a monosubstituted thiourea is used a mixture of two isomers (VIa and VIb) may be obtained, and one of these isomers (the VIb isomer) may in turn be the result of an equilibrium between two tautomeric forms (VIb¹ and VIb²) as illustrated by the following reaction:

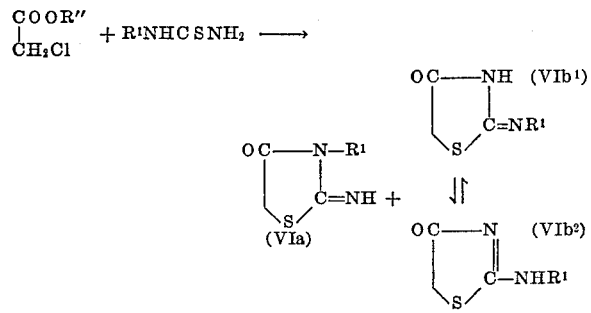

in which R" is an alkyl group and R¹ is as hereinbefore defined.

The results which we have obtained agree with those which have already been published and confirm the predominance of the 2-iminothiazolide-4-one form (VIb¹) when R¹ is an aryl or an acyl group and the predominance of the 2-amino-2-thiazoline-4-one form (VIb²) when R¹ is an alkyl, a cycloalkyl or an aralkyl substituent. Methylthiourea generally leads to comparable quantities of the two isomers VIa and VIb². If the heating time in the cyclisation step is prolonged, the VIa isomer (labile form) may be converted into the stable VIb² isomer which has been isolated in high yields.

The structure of the above products is confirmed by spectrographic studies.

Starting from unsymmetrically disubstituted thioureas, only the following type of amine can be formed:

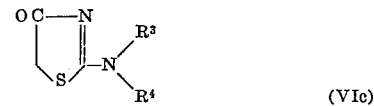

Compounds of the Formula VIc may be obtained by treating the sodium or potassium salts of the monosubstituted compounds (—NHR³) with an alkylating agent or by treating rhodanine with a secondary amine (which may be a secondary cyclic amine). All these types of products are obtained by the ring closure of the corresponding thioureas by heating with monochloroacetic acid or with its methyl or ethyl esters in a diluent such as ethanol, 2-propanol, n-butanol, acetic acid or benzene. Depending upon whether or not sodium or potassium acetate is added the cyclisation product is obtained either in the form of the base or in the form of the hydrochloride.

The aryl 2-sulphonylamido-derivatives may be obtained by treating the corresponding pseudothiohydantoin with an arylsulphonyl chloride in pyridine. The semicarbazone of the 2-derivative is obtained by treating the corresponding rhodanine with semicarbazide in known manner whilst the 2-guanidyl derivative may be obtained by ring closure of thioglycollic acid with cyanoguanidine in aqueous solution whilst heating. Condensation of all these derivatives with the nitrofuran aldehydes may be carried out under the conditions already mentioned above, namely heating in an acetic acid medium in the presence of anhydrous sodium or potassium acetate until the product has precipitated; isolation and purification may be effected as previously described. It is not essential to isolate the thiazolidine-4-one before condensation with the nitrofuran aldehyde since these two reactions of forming the heterocycle and condensation of the heterocycle can take place simultaneously. When the 3-position is unsubstituted, the products are capable of undergoing certain reactions, such as those leading to the formation of the corresponding Mannich bases by reaction with formaldehyde and a secondary amine.

Typical compounds produced according to the invention are listed in the following tables; the examples to which the first column refers follow the tables:

TABLE I

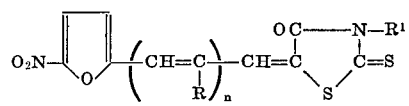

| Example | Code | n | R | R¹ | M.P. (deg.) | Name |
|---|---|---|---|---|---|---|
| 1 | 10290 | 0 | | Ethyl | 150 | 3-ethyl-5-(5'-nitrofurfurylidene)-2-thioxothiazolidine-4-one. |
|  | 10289 | 0 | | Methyl | 190 | 3-methyl-5-(5'-nitrofurfurylidene)-2-thioxothiazolidine-4-one. |
|  | 10291 | 0 | | Allyl | 145 | 3-allyl-5-(5'-nitrofurfurylidene)-2-thioxothiazolidine-4-one. |
|  | 10292 | 0 | | n-Heptyl | 124 | 3-n-heptyl-5-(5'-nitrofurfurylidene)-2-thioxothiazolidine-4-one. |
|  | 10293 | 0 | | n-Dodecyl | 104 | 3-n-dodecyl-5-(5'-nitrofurfurylidene)-2-thioxothiazolidine-4-one. |
|  | 10381 | 0 | | n-Hexadecyl | 114 | 3-n-hexadecyl-5-(5'-nitrofurfurylidene)-2-thioxothiazolidine-4-one. |
|  | 10294 | 0 | | Ethylol | 163 | 3-hydroxyethyl-5-(5'-nitrofurfurylidene)-2-thioxo-thiazolidine-4-one. |
|  | 10385 | 0 | | Cyclopropyl | 154 | 3-cyclopropyl-5-(5'-nitrofurfurylidene)-2-thioxothiazolidine-4-one. |
|  | 10387 | 0 | | Ortho-hydroxy cyclohexyl | 203 | 3-ortho-hydroxycyclohexyl-5-(5'-nitrofurfurylidene)-2:thioxothiazolidine-4-one. |
| 2 | 10453 | 1 | Br | H | 218–220 | 5-[2'-bromo-2'-(5''-nitrofurfurylidene)ethylidene]-2-thioxo-thiazolidine-4-one. |
| 3 | 10452 | 1 | H | H | 235 | 5[2'-5'-nitrofurfurylidene)ethylidene]-2-thioxo-thiazolidine-4-one. |
| 4 | 10374 | 0 | | Carboxymethyl (ammonium salt) | ¹230 | Ammonium salt of 3-carboxymethyl-5-(5'-nitrofurfurylidene)-2-thioxo-thiazolidine-4-one. |
|  | 10483 | 1 | H | Carboxymethyl | 230 | 3-carboxymethyl-5-[2'-(5''-nitrofurfurylidene)ethylidene]-2-thixo-thiazolidine-4-one. |
|  | 10380 | 0 | | 1-carboxyethyl (ammonium salt) | ¹180 | Ammonium salt of 3(1'-carboxyethyl)-5-(5''-nitrofurfurylidene)-2-thioxo-thiazolidine-4-one. |
|  | 10481 | 0 | | Carbethoxymethyl | 206 | 3-ethoxycarbonylmethyl-5-(5'-nitrofurfurylidene)-2-thioxo-thiazolidine-4-one. |
|  | 10482 | 1 | H | do | 170 | 3-ethoxycarbonylmethyl-5-[2'-(5''-nitrofurfurylidene)ethylidene]-2-thioxothiazolidine-4-one. |

TABLE I—Continued

| Example | Code | n | R | R¹ | M.P. (deg.) | Name |
|---|---|---|---|---|---|---|
| 5 | 10580 | 0 | | Pyrrolidinocarbamoylmethyl | 264 | 3-pyrrolidinocarbamoylmethyl-5-(5'-nitrofurfurylidene)-2-thioxothiazolidine-4-one. |
|  | 10581 | 1 | H | do | 253 | 3-pyrrolidinocarbamoylmethyl-5-[2'-(5''-nitrofurfurylidene)-ethylidene]-2-thioxo-thiazolidine-4-one. |
|  | 10578 | 0 | | Carbamoylmethyl | 265 | 3-carbamoylmethyl-5-(5'-nitrofurfurylidene)-2-thioxo-thiazolidine-4-one. |
|  | 10579 | 1 | H | do | 279 | 3-carbamoylmethyl-5-[2'-(5''-nitrofurfurylidene)-ethylidene]-2-thioxothiazolidine-4-one. |
|  | 10583 | 0 | | Morpholinocarbamoylmethyl | 188 | 3-morpholinocarbamoylmethyl-5-(5'-nitrofurfurylidene)-2-thioxo-thiazolidine-4-one. |
|  | 10584 | 1 | H | do | 260 | 3-morpholinocarbamoylmethyl-5-[2'-(5''-nitrofurfurylidene)ethylidene]-2-thioxo-thiazolidine-4-one. |
|  | 10586 | 0 | | N-isonicotinyl-hydrazidocarboxy-methyl | 272 | 3-N-(isonicotinyl)hydrazidocarboxymethyl-5-(5-''nitrofurfurylidene)-2-thioxo-thiazolidine-4-one. |
|  | 10587 | 1 | H | do | 274 | 3-(N-isonicotinyl)-hydrazidocarboxymethyl-5-[2'-(5'''-nitrofurfurylidene)ethylidene]-2-thioxo-thiazolidine-4-one. |
| 6 | 10683 | 1 | H | Methylol | ²192 | 3-hydroxymethyl-5-[2'-(5''-nitrofurfurylidene)ethylidene]-2-thioxo-thiazolidine-4-one. |
|  | 10682 | 0 | | do | ²174 | 3-hydroxymethyl-5-(5'-nitrofurfurylidene)-2-thioxo-thiazolidine-4-one. |
| 7 | 10540 | 0 | | Morpholinomethyl | 156–157 | 3-N-morpholinomethyl-5-(5'-nitrofurfurylidene)-2-thioxo-thiazolidine-4-one. |
| 8 | 10535 | 0 | | Para-benzenesulphonamido | ¹260 | 3-para-sulphamoylphenyl-5-(5'-nitrofurfurylidene)-2-thioxo-thiazolidine-4-one. |
|  | 10536 | 1 | H | Para-benzenesulphonamide | 283 | 3-para-sulphamoylphenyl-5-[2'-(5''-nitrofurfurylidene)ethylidene]-2-thioxo-thiazolidine-4-one. |
|  | 10382 | 0 | | Para-chlorophenyl | 202 | 3-para-chlorophenyl-5-(5'-nitrofurfurylidene)-2-thioxo-thiazolidine-4-one. |
|  | 10432 | 0 | | Para-carboxyphenyl | 268 | 3-para-carboxyphenyl-5-(5'-nitrofurfurylidene)-2-thioxo-thiazolidine-4-one. |
|  | 10383 | 0 | | Benzyl | 215–216 | 3-benzyl-5-(5'-nitrofurfurylidene)-2-thioxo-thiazolidine-4-one. |
|  | 10384 | 0 | | Para-chlorobenzyl | 225 | 3-para-chlorobenzyl-5-(5'-nitrofurfurylidene)-2-thioxo-thiazolidine-4-one. |
| 9 | 10430 | 0 | | 5-nitrofurfurylidineamino | 256–258 | 3-(5'-nitrofurfurylideneamino)-5-(5''-nitrofurfurylidene)-2-thioxo-thiazolidine-4-one. |

¹ Dec. ² Inst.

TABLE II

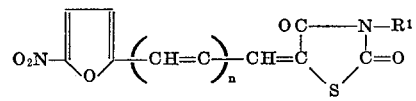

| Example | Code | n | R | R¹ | M.P. (deg.) | Name |
|---|---|---|---|---|---|---|
| 10 | 10743 | 0 | | —H | 225 | 5-(5'-nitrofurfurylidene)-thiazolidine-2,4-dione. |
| 11 | 10744 | 1 | H | —H | 260 | 5-[2'-(5''-nitrofurfurylidene)ethylidene]-thiazolidine-2,4-dione. |
| 12 | 11137 | 1 | Br | —H | 260 | 5-[2'-bromo-2'-(5''-nitrofurfurylidene)ethylidene]-thiazolidine-2,4-dione. |
| 13 | 10933 | 0 | | Methyl | 211–212 | 3-methyl-5-(5'-nitrofurfurylidene)-thiazolidine-2,4-dione. |
|  | 10934 | 1 | H | do | 229 | 3-methyl-5-[2'-(5''-nitrofurfurylidene)ethylidene]-thiazolidine-2,4-dione. |
|  | 11064 | 0 | | Ethyl | 123 | 3-ethyl-5-(5'-nitrofurfurylidene)-thiazolidine-2,4-dione. |
|  | 11080 | 0 | | β-Chloroethyl | 127 | 3-β-chloroethyl-5-(5'-nitrofurfurylidene)-thiazolidine-2,4-dione. |
|  | 11065 | 1 | H | Ethyl | 204 | 3-ethyl-5-[2'-(5''-nitrofurfurylidene)ethylidene]-thiazolidine-2,4-dione. |
|  | 11071 | 0 | | Isopropyl | 121 | 3-isopropyl-5-(5'-nitrofurfurylidene)-thiazolidine-2,4-dione. |
|  | 11072 | 1 | H | do | 240 | 3-isopropyl-5-[2'-(5''-nitrofurfurylidene)ethylidene]-thiazolidine-2,4-dione. |
|  | 10829 | 0 | | Allyl | 138 | 3-allyl-5-(5'-nitrofurfurylidene)-thiazolidine-2,4-dione. |
|  | 10830 | 1 | H | do | 164 | 3-allyl-5-[2'-(5''-nitrofurfurylidene)ethylidene]thiazolidine-2,4-dione. |
|  | 11245 | 0 | | Propynyl | 166 | 3-(2'-propynyl)-5-(5'-nitrofurfurylidene)-thiazolidine-2,4-dione. |
| 13 | 11246 | 0 | | n-Pentyl | 92 | 3-n-pentyl-5-(5'-nitrofurfurylidene)-thiazolidine-2,4-dione. |
|  | 11247 | 1 | H | do | 147 | 3-n-pentyl-5-[2'-(5''-nitrofurfurylidene)-ethylidene]-thiazolidine-2,4-dione. |
|  | 11076 | 0 | | n-Hexyl | 84 | 3-n-hexyl-5-(5'-nitrofurfurylidene)-thiazolidine-2,4-dione. |
|  | 11077 | 1 | H | do | 146 | 3-n-hexyl-5-[2'-(5''-nitrofurfurylidene)ethylidene]-thiazolidine-2,4-dione. |
|  | 11248 | 0 | | n-Heptyl | 88 | 3-n-heptyl-5-(5'-nitrofurfurylidene)-thiazolidine-2,4-dione. |
|  | 11249 | 1 | H | do | 128 | 3-n-heptyl-5-[2'-(5''-nitrofurfurylidene)ethylidene]-thiazolidine-2,4-dione. |
|  | 11250 | 0 | | n-Octyl | 90 | 3-n-octyl-5-(5'-nitrofurfurylidene)-thiazolidine-2,4-dione. |
|  | 11251 | 1 | H | do | 135 | 3-n-octyl-5-[2'-(5''-nitrofurfurylidene)ethylidene]-thiazolidine]-thiazolidine-2,4-dione. |
|  | 11252 | 0 | | n-Hexadecyl | 94 | 3-n-hexadecyl-5-(5'-nitrofurfurylidene)-thiazolidine-2,4-dione. |
|  | 11253 | 1 | H | do | 137 | 3-n-hexadecyl-5-[2'-(5''-nitrofurfurylidene)ethylidene]-thiazolidine-2,4-dione. |
| 14 | 11078 | 0 | | Carbethoxy | 123–124 | 3-ethoxycarbonyl-5-(5'-nitrofurfurylidene)-thiazolidine-2,4-dione. |
| 15 | 10827 | 0 | | Carbethoxymethyl | 181–182 | 3-ethoxycarbonylmethyl-5-(5'-nitrofurfurylidene)thiazolidine-2,4-dione. |
| 16 | 10828 | 1 | H | do | 150 | 3-ethoxycarbonylmethyl-5-[2'-(5''-nitrofurfurylidene)ethylidene]-thiazolidine-2,4-dione. |
| 17 | 11067 | 0 | | Carboxymethyl | 115 | 3-carboxymethyl-5-(5'-nitrofurfurylidene)-thiazolidine-2,4-dione. |
| 18 | 11079 | 1 | H | do | 245 | 3-carboxymethyl-5-[2'-(5''-nitrofurfurylidene)-ethylidene]-thiazolidine-2,4-dione. |
| 19 | 10946 | 0 | | β-carbethoxyallyl | 154 | 3-(3'-ethoxycarbonylpropen-2'-yl)-5-(5''-nitrofurfurylidene)-thiazolidine-2,4-dione. |
| 20 | 10947 | 1 | H | do | 173 | 3-(3'-ethoxycarbonyl-propen-2'-yl-5-[2'-(5'''-nitrofurfurylidene)ethylidene]-thiazolidine-2,4-dione. |
| 21 | 10787 | 0 | | Methylol | ¹120 | 3-hydroxymethyl-5-(5'-nitrofurfurylidene)-thiazolidine-2,4-dione. |
| 22 | 10932 | 1 | H | do | ¹120 | 3-hydroxymethyl-5-[2'-(5''-nitrofurfurylidene)ethylidene]-thiazolidine-2,4-dione. |
| 23 | 10985 | 1 | H | Dimethylaminomethyl | 175 | 3-dimethylaminomethyl-5-[2'-(5''-nitrofurfurylidene)ethylidene]-thazolidine-2,4-dione. |
|  | 11001 | 0 | | do | 130 | 3-dimethylaminomethyl-5-(5'-nitrofurfurylidene)-thiazolidine-2,4-dione. |
|  | 11136 | 1 | H | Diethylaminomethyl | 160 | 3-diethylaminomethyl-5-[2'-(5''-nitrofurfurylidene)ethylidene]-thiazolidine-2,4-dione. |
|  | 10988 | 0 | | Diethylolaminomethyl | 86 | 3-bis(2'-hydroxyethyl)aminomethyl-5-(5'-nitrofurfurylidene)-thiazolidine-2,4-dione. |
|  | 11003 | 1 | H | Diethylaminomethyl | 143 | 3-bis(2'-hydroxyethyl)aminomethyl-5-[2'-(5'''-nitrofurfurylidene)ethylidene]-thiazolidine-2,4-dione. |
|  | 10999 | 0 | | Pyrrolidinomethyl | 106 | 3-N-pyrrolidinomethyl-5-(5'-nitrofurfurylidene)-thiazolidine-2,4-dione. |
|  | 11000 | 1 | H | do | 158 | 3-N-pyrrolidinomethyl-5-[2'-(5''-nitrofurfurylidene)-ethylidene]-thiazolidine-2,4-dione. |
|  | 10989 | 0 | | Piperidinomethyl | 138 | 3-N-piperidinomethyl-5-(5'-nitrofurfurylidene)-thiazolidine-2,4-dione. |
|  | 11004 | 1 | H | do | 192 | 3-N-piperidinomethyl-5-[2'-(5''-nitrofurfurylidene)ethylidene]-thiazolidene-2,4-dione. |

TABLE II—Continued

| Example | Code | n | R | R¹ | M.P. (deg.) | Name |
|---|---|---|---|---|---|---|
| 23 (cont.) | 10888 | 0 | | Morpholinomethyl | 174 | 3-N-morpholinomethyl-5-(5'-nitrofurfurylidene)-thiazolidine-2,4-dione. |
| | 10889 | 1 | H | do | 198 | 3-N-morpholinomethyl-[2'-(5''-nitrofurfurylidene)ethylidene]-thiazolidine-2,4-dione. |
| | 11075 | 1 | H | Piperazinomethyl | 250 | 3-N-piperazinomethyl-5-[2'-(5''-nitrofurfurylidene)ethylidene]-thiazolidine-2,4-dione. |
| | 11066 | 1 | H | N'-ethylolpiperazinomethyl | 150 | 3-(N'-β-hydroxyethyl-N-piperazinomethyl)-5-[2''-(5'''-nitrofurfurylidene)ethylidene]-thiazolidine-2,4-dione. |
| 24 | 10677 | 0 | | β-Aminoethyl (hydrochloride) | ²205 | 3-(β-aminoethyl)-5-(5'-nitrofurfurylidene)-thiazolidine-1,4-dione hydrochloride. |
| 25 | 10741 | 1 | H | do | ²220 | 3-(β-aminoethyl)-5-[2'-(5''-nitrofurfurylidene)ethylidene]-thiazolidine-2,4-dione hydrochloride. |
| 26 | 10831 | 0 | | Benzyl | 201 | 3-benzyl-5-(5'-nitrofurfurylidene)-thiazolidine-2,4-dione. |
| | 10832 | 1 | H | do | 183 | 3-benzyl-5-[2'-(5''-nitrofurfurylidene)ethylidene]-thiazolidine-2,4-dione. |
| | 10833 | 0 | | Para-nitrobenzyl | 230 | 3-(para-nitrobenzyl)-5-(5'-nitrofurfurylidene)-thiazolidine-2,4-dione. |
| | 10834 | 1 | H | do | 233 | 3-(para-nitrobenzyl)-5-[2'-(5''-nitrofurfurylidene)ethylidene]-thiazolidine-2,4-dione. |
| 37 and 38 | 12004 | 0 | | β-Bromoethyl | 134 | 3-β-bromo-ethyl-5-(5'-nitrofurfurylidene)-thiazolidine-2,4-dione. |
| 39 | 12003 | 0 | | γ-Chloropropyl | 158 | 3-γ-chloropropyl-5-(5'-nitrofurfurylidene)thiazolidine-2,4-dione. |

¹ Dec.  ² Inst.

TABLE III

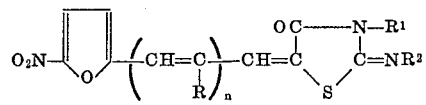

| Example | Code | n | R | R¹ | R² | M.P. (deg.) | Name |
|---|---|---|---|---|---|---|---|
| 27 | 10746 | 1 | H | H | H | ¹300 | 2-imino-5-[2'-(5''-nitrofurfurylidene)ethylidene]-thiazolidine-4-one. |
| 28 | 11141 | 0 | | Methyl | H | 260 | 2-imino-3-methyl-5-(5'-nitrofurfurylidene)-thiazolidine-4-one. |
| | 11142 | 1 | H | do | H | 224-225 | 2-imino-3-methyl-5-[2'-(5''-nitrofurfurylidene) ethylidene]-thiazolidine-4-one. |
| 29 | 11025 | 0 | | do | Methyl | 240 | 2-methylimino-3-methyl-5-(5'-nitrofurfurylidene)-thiazolidine-4-one. |
| | 11026 | 1 | H | do | do | 256 | 2-methylimino-3-methyl-5-[2'-(5''-nitrofurfurylidene)ethylidene)-thiazolidine-4-one. |
| | 10983 | 0 | | Allyl | Allyl | 125 | 2-allylimino-3-allyl-5-(5'-nitrofurfurylidene)-thiazolidine-4-one. |
| | 10984 | 1 | H | do | do | 140 | 2-allylimino-3-allyl-5-[2'-(5''-nitrofurfurylidene)-ethylidene]-thiazolidine-4-one. |
| | 10986 | 0 | | Phenyl | Phenyl | 268 | 2-phenylimino-3-phenyl-5-(5'-nitrofurfurylidene)-thiazolidine-4-one. |
| 30 | 11002 | 0 | | H | do | 315 | 2-phenylimino-5-(5'-nitrofurfurylidene)-thiazolidine-4-one. |
| | 11019 | 1 | H | H | do | 280 | 2-phenylimino-5-[2'-(5''-nitrofurfurylidene)-ethylidene]-thiazolidine-4-one. |
| | 11005 | 0 | | H | Orthochlorophenyl | 242 | 2-ortho-chlorophenylimino-5-(5'-nitrofurfurylidene)-thiazolidine-4-one. |
| 31 | 11022 | 0 | | Morpholinomethyl | Phenyl | ²225 | 2-phenylimino-3-N-morpholinomethyl-5-(5'-nitrofurfurylidene)-thiazolidine-4-one. |
| | 11023 | 1 | H | do | do | ²192 | 2-phenylimino-3-N-morpholinomethyl-5-[2'-(5''-nitrofurfurylidene)ethylidene]-2-thiazolidine-4-one. |
| | 11024 | 0 | | do | Orthochlorophenyl | ²215 | 2-ortho-chlorophenylimino-3-morpholinomethyl-5-(5'-nitrofurfurylidene)-thiazolidine-4-one. |
| 32 | 11058 | 0 | | H | Paratoluenesulphonyl | 267 | 2-para-toluenesulphonylimino-5-(5'-nitrofurfurylidene)-thiazolidine-4-one. |
| | 11059 | 1 | H | H | do | 254 | 2-para-toluenesulphonylimino-5-[2'-(5''-nitrofurfurylidene)-ethylidene]-thiazolidine-4-one. |
| | 11060 | 0 | | H | Benzenesulphonyl | 276 | 2-benzenesulphonylimino-5-(5'-nitrofurfurylidene)-thiazolidine-4-one. |
| | 11061 | 1 | H | H | do | 256 | 2-benzenesulphonylimino-5-[2'-(5''-nitrofurfurylidene)-ethylidene]-thiazolidine-4-one. |
| 33 | 11073 | 1 | H | H | Carbamido | 248 | 2-semicarbazono-5-[2'-(5''-nitrofurfurylidene)-ethylidene]-thiazolidine-4-one. |
| 34 | 11074 | 0 | | H | Amidinomethyl | 366 | 2-guanidyl-5-(5'-nitrofurfurylidene)-thiazolidine-4-one. |

¹ Dec.  ² Inst.

TABLE IV

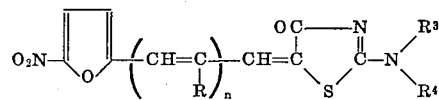

| Example | Code | n | R | R³ | R⁴ | M.P. (deg.) | Name |
|---|---|---|---|---|---|---|---|
| 35 | 11139 | 0 | | Methyl | H | 328 | 2-methylamino-5-(5'-nitrofurfurylidene)-thiazoline-4-one. |
| | 11140 | 1 | H | do | H | ¹275 | 2-methylamino-5-[2'-('5''-nitrofurfurylidene)ethylidene]-thiazoline-4-one. |
| | 11376 | 1 | Br | do | H | ¹285 | 2-methylamino-5-[2'-bromo-2'(5''-nitrofurfurylidene)ethylidene]-thiazoline-4-one. |
| | 11062 | 0 | | Ethyl | H | 285 | 2-ethylamino-5-(5'-nitrofurfurylidene)-thiazoline-4-one. |
| | 11063 | 1 | H | do | H | ¹265 | 2-ethylamino-5-[2'-(5''-nitrofurfurylidene)ethylidene]-thiazoline-4-one. |
| | 11138 | 1 | Br | do | H | 278 | 2-ethylamino-5-[2'-bromo-2'-(5''-nitrofurfurylidene)ethylidene]-thiazoline-4-one. |
| | 11171 | 0 | | Allyl | H | ¹245-248 | 2-allylamino-5-(5'-nitrofurfurylidene)-thiazoline-4-one. |
| | 11172 | 1 | H | do | H | ¹210-212 | 2-allylamino-5-[2'-(5''-nitrofurfurylidene)-ethylidene]-thiazoline-4-one. |
| | 11143 | 0 | | n-Propyl | H | ¹252 | 2-n-propylamino-5-(5'-nitrofurfurylidene)-thiazoline-4-one. |
| | 11144 | 1 | H | do | H | ¹240 | 2-n-propylamino-5-[2'-(5''-nitrofurfurylidene)ethylidene]-thiazoline-4-one. |
| | 11173 | 0 | | Isopropyl | H | 280 | 2-isopropylamino-5-(5'-nitrofurfurylidene)-thiazoline-4-one. |
| | 11174 | 1 | H | do | H | 252 | 2-isopropylamino-5-(2'-[5''-nitrofurfurylidene)ethylidene]-thiazoline-4-one. |
| | 11377 | 1 | Br | do | H | 300 | 2-isopropylamino-5-[3'-bromo-2'-(5''-nitrofurfurylidene)ethylidene]-thiazoline-4-one. |

TABLE IV—Continued

| Example | Code | n | R | R³ | R⁴ | M.P. (deg.) | Name |
|---|---|---|---|---|---|---|---|
| | 11175 | 0 | | n-Butyl | H | 228 | 2-n-butylamino-5-(5'-nitrofurfurylidene)-thiazoline-4-one. |
| | 11176 | 1 | H | do | H | 232 | 2-n-butylamino-5[2'-(5''-nitrofurfuryl idene)ethylidene]-thiazoline-4-one. |
| | 11177 | 0 | | Cyclohexyl | H | 295 | 2-cyclohexylamino-5(5'-nitrofurfurylidene)-thiazoline-4-one. |
| | 11178 | 1 | H | do | H | 268 | 2-cyclohexylamino-5[2'-(5''-nitrofurfurylidene)ethylidene]-thiazoline-4-one. |
| | 11378 | 1 | Br | do | H | ¹312 | 2-cyclohexylamino-5[2'-bromo-2'-(5''-nitrofurfurylidene)ethylidene] thiazoline-4-one. |
| 36 | 11020 | 0 | | Benzyl | H | 254 | 2-benzylamino-5(5'-nitrofurfurylidene)-thiazoline-4-one. |
| | 11021 | 1 | H | do | H | 242 | 2-benzylamino-5[2'-(5''-nitrofurfurylidene)ethylidene]-thiazoline-4-one. |
| | 11379 | 1 | Br | do | H | ¹286 | 2-benzylamino-5[2'-bromo-2'-(5''-nitrofurfurylidene)ethylidene]-thiazoline-4-one. |
| | 11254 | 0 | | Parachlorobenzyl | H | 271 | 2-para-chlorobenzylamino-5(5'-nitrofurfurylidene)-thiazoline-4-one. |
| | 11255 | 1 | H | do | H | 247 | 2-para-chlorobenzylamino-5[2'-(5''-nitrofurfurylidene)ethylidene]-thiazoline-4-one. |
| | 11262 | 0 | | Methyl | Methyl | 270 | 2-dimethylamino-5(5'-nitrofurfurylidene)-thiazoline-4-one. |
| | 11263 | 1 | H | do | do | 218 | 2-dimethylamino-5[2'-(5''-nitrofurfurylidene) ethylidene]-thiazoline-4-one. |
| | 11389 | 1 | Br | do | do | 256 | 2-dimethylamino-5[2'-bromo-2'-(5''-nitrofurfurylidene) ethylidene]thiazoline-4-one. |
| | 11273 | 0 | | Ethyl | Ethyl | 200 | 2-diethylamino-5(5'-nitrofurfurylidene)-thiazoline-4-one. |
| | 11390 | 1 | H | do | do | 228 | 2-diethylamino-5[2'-(5''-nitrofurfurylidene) ethylidene]-thiazoline-4-one. |
| | 11391 | 1 | Br | do | do | 211 | 2-diethylamino-5[2'-bromo-2'-(5''-nitrofurfurylidene) ethylidene] thiazoline-4-one. |
| | 11274 | 0 | | Benzyl | Methyl | 224 | 2-methylbenzylamino-5(5'-nitrofurfurylidene)-thiazoline-4-one. |
| | 11275 | 1 | H | do | do | 209 | 2-methylbenzylamino-5[2'-(5''-nitrofurfurylidene) ethylidene]-thiazoline-4-one. |
| | 11276 | 0 | | Phenyl | do | 240 | 2-methylphenylamino-5(5'-nitrofurfurylidene)-thiazoline-4-one. |
| | 11291 | 1 | H | do | do | 233 | 2-methylphenylamino-5[2'-(5''-nitrofurfurylidene)ethylidene]-thiazoline-4-one. |
| | 11292 | 0 | | Morpholino | | 278 | 2-(N-morpholino)-5(5'-nitrofurfurylidene)-thiazoline-4-one. |
| | 11293 | 1 | H | Morpholino | | 238 | 2-(N-morpholino)-5-[2'-(5''-nitrofurfurylidene)ethylidene]-thiazoline-4-one. |

¹ Inst.

The following examples illustrate the preparation of the compounds.

EXAMPLE 1

Compound 10290

0.705 g. (0.05 mol) of 5-nitrofurfural in solution in 5 ml. of absolute ethanol is added to 0.80 g. (0.05 mol) of 3-ethylrhodanine in solution in 5 ml. of ethanol and 1.5 g. of anhydrous potassium acetate in solution in 5 ml. of acetic acid. The reaction mixture is heated to 65° C. on a water bath for 1.5 hours; after cooling the precipitate is separated by suction filtration, washed with water, then with alcohol and ether and finally dried. The product has M.P.=150° C. Yield 1.1 g. (77% of theoretical).

The derivatives which have, in the 3-position, a methyl (10289), allyl (10291), n-heptyl (10292), n-dodecyl (10293), n-hexadecyl (10381), β-hydroxyethyl (10294), cyclopropyl (10385), or 2-hydroxy-cyclohexyl (10387) group are obtained in a similar manner by using the corresponding 3-substituted rhodanines.

EXAMPLE 2

Compound 10453

1 g. (0.004 mol) of α-bromo-β-(5-nitrofuryl-2)-acrolein is dissolved in 5 ml. of ethanol and treated with 0.53 g. (0.004 mol) of rhodanine dissolved in 5 ml. of hot ethanol and then with 1.32 g. of anhydrous potassium acetate dissolved in 6 ml. of acetic acid. After heating on a water bath at 60° C. for 4 hours, a precipitate is formed which is separated by suction filtration after cooling, washed with water and ethanol and finally recrystallised from nitromethane. The compound is a red powder which melts at 218 to 220° C. and weighs 0.7 g. (yield: 49%).

EXAMPLE 3

Compound 10452

1 g. (0.0075 mol) of rhodanine dissolved in 12 ml. of absolute ethanol and 2.2 g. of anhydrous potassium acetate dissolved in 10 ml. of pure acetic acid are added to 1.26 g. (0.0075 mol) of β-(5-nitrofuryl-2)-acrolein dissolved in 8 ml. of absolute ethanol.

After heating on a water bath at 75° C. for 2 hours and cooling, the precipitate is separated by suction filtration, thoroughly washed with alcohol and dried. The product is obtained in the form of red needles which turn yellow when washed with a little dimethylformamide. 1.52 g. is obtained (yield 72%), M.P.=235° C.

EXAMPLE 4

Compound 10374

The following solutions are prepared: 2.82 g. (0.02 mol) of 5-nitrofurfural in 20 ml. of ethanol, 3.82 g. (0.02 mol) of N-rhodanine acetic acid in 40 ml. of ethanol and 5.5 g. of anhydrous potassium acetate dissolved in 35 ml. of acetic acid. These solutions are mixed together and heated at 70° C. on a water bath for 4 hours; after removal of the major portion of the alcohol under reduced pressure, the precipitate obtained is washed with water, then with alcohol and recrystallised from nitromethane. It melts at 218° C. 4.2 g. of product is obtained (yield: 67%).

The acid is suspended in a little distilled water and neutralised to pH 7.0 with a 0.1 N ammonia solution. By lyophilisation of the solution, the ammonium salt, which melts at 230° C. with decomposition, is obtained.

Similar compounds having in the 3-position a carboxymethyl group (10483), 1-carboxyethyl (10380) or carbethoxymethyl (10481) as well as the compound having a 2'-(5''-nitrofurfurylidene) ethylidene group in the 5-position and a carbethoxymethyl group in the 3-position (10482) are obtained in analogous manner to that described above from the correspondingly substituted rhodamine derivatives.

EXAMPLE 5

Compound 10580

3.84 g. (0.02 mol) of 3-carboxymethylrhodanine are suspended in 80 ml. of anhydrous benzene and treated on a water bath at 80° C. with 4.8 g. (0.04 mol) of thionyl chloride for about 30 minutes with stirring. After this time dissolution is complete and the benzene and excess of thionyl chloride are evaporated under reduced pressure; the residual oil is the crude carboxylic acid chloride.

This oil is dissolved in 50 ml. of anhydrous ether and treated, with cooling, with 2.84 g. (0.04 mol) of pyrrolidine in 20 ml. of ether. The amide which precipitates is separated by suction filtration and recrystallised from methanol. When dried, it weighs 3.2 g. (yield 62%) and melts at 212° C.

1.22 g. (0.005 mol) of this amide in solution in 10 ml. of acetic acid, and 0.705 g. (0.005 mol) of 5-nitrofurfural in solution in 5 ml. of ethanol are added to 1.5 g. of potassium acetate dissolved in 8 ml. of acetic acid. After heating for 3 hours on a water bath at 65° C., the precipitate is filtered off, washed with ethanol and recrystallised from a little acetic acid. The dry product weighs 1.3 g. (yield 62%) and melts at 264° C.

The derivatives having in the 3-position, a carbamoylmethyl (10578), a morpholino-carbamoylmethyl (10583) or isonicotinylhydrazido carboxymethyl (10586) group as well as those which have a 2'-(5''-nitrofurfurylidene) ethylidene group in the 5-position and in the 3-position a pyrrolidino carbamoyl methyl group (10581), a carbamoylmethyl group (10579), a morpholino carbamoyl methyl group (10584) or an isonicotinylhydrazidocarboxymethyl group (10587) are obtained in an analogous manner from the acid chloride and ammonia, morpholine or isonicotinic acid hydrazide followed by condensation with 5-nitrofurfural or β-(5-nitrofurfuryl-2) acrolein.

EXAMPLE 6

Compound 10683

13 g. (0.046 mol) of 2-thioxo-5[2'-(5''-nitrofurfurylidene)ethylidene]-thiazolidine-4-one are dissolved at 70° C. in 200 ml. of dimethylformamide; 0.5 ml. of piperidine followed by 8.6 ml. (0.1 mol) of 35% aqueous formaldehyde are then added thereto. After 2 minutes on a water bath at 70° C., the clear solution is kept at room temperature for 5 hours, and is then poured onto a mixture of ice and water (about 500 ml.) containing 5 ml. of 35% formaldehyde. The precipitate is filtered, washed with 1% aqueous formaldehyde and dried under reduced pressure over phosphorus pentoxide at 50° C. to constant weight. It then weighs 13 g. (90% yield), instantaneous melting point: 192° C. By progressive heating it loses one equivalent of formaldehyde at temperatures of 120° C. upwards.

The compound which has a 5'-nitrofurfurylidene group in the 5-position (10682) is obtained in a similar manner from 2-thioxo-5-(5'-nitrofurfurylidene)thiazolidine-4-one.

EXAMPLE 7

Compound 10540

1.28 g. (0.005 mol) of 5-(5'-nitrofurfurylidene)-2-thioxo-thiazolidine-4-one are suspended in 30 ml. of ethanol, and 0.45 ml. (slight excess) of 35% aqueous formaldehyde is added dropwise and then, while cooling on an ice bath, 0.44 g. of distilled morpholine. After 15 hours' stirring at room temperature, the precipitate is filtered by suction and dried. A little more of the same product is obtained by evaporating the ethanol. There is obtained 1.7 g. (yield 96%), M.P.=156–157° C.

EXAMPLE 8

Compound 10535

A solution of 0.705 g. (0.005 mol) of 5-nitrofurfural in 5 ml. of ethanol is added to 1.44 g. (0.005 mol) of 3-(parasulphonamidophenyl)-rhodanine in solution in the minimum quantity of boiling acetic acid and 1.4 g. of anhydrous potassium acetate in solution in 8 ml. of acetic acid. After this reaction mixture has been heated on the boiling water bath for 4 hours, the greater part of the solvent is evaporated under reduced pressure, the precipitate is filtered by suction, washed with a little ethanol and dried. The product weighed 1.4 g. (yield 68%), M.P. (decomposition)=260° C.

The analogous derivatives having in the 3-position a para-chlorophenyl (10382), para-carboxyphenyl (10432), benzyl (10383) or para-chlorobenzyl (10384) group as well as that which has a 2'-(5''-nitrofurfurylidene)-ethylidene group in the 5-position and a para-sulphamoylphenyl group in the 3-position (10536) can be obtained by this process from the corresponding 3-(substituted phenyl) rhodanines and, in the latter case β-(5-nitrofuryl-2) acrolein.

EXAMPLE 9

Compound 10430

A solution of 0.85 g. (0.006 mol) of 5-nitrofurfural in 5 ml. of ethanol is added dropwise to 0.89 g. (0.006 mol) of 3-aminorhodanine dissolved in a mixture of 15 ml. of ethanol and 0.5 ml. of 2 N hydrochloric acid. The reaction mixture is kept on a water bath at 60° C. for 20 minutes and then, after standing overnight at room temperature, the precipitate is filtered by suction and dried; it weighs 1.5 g.

The hydrazone prepared as described above (1.5 g. 0.0055 mol) is dissolved in 20 ml. of boiling acetic acid and treated with 0.85 g. (0.006 mol) of 5-nitrofurfural dissolved in 3 ml. of acetic acid and 2.5 g. of anhydrous potassium acetate dissolved in 15 ml. of acetic acid. After 3 hours' heating on a water bath at 90° C. and cooling, the precipitate is isolated and recrystallised from nitromethane. M.P.=256–258° C. The product weighed 1.6 g. (overall yield: 68%).

EXAMPLE 10

Compound 10743 and its potassium derivative (A) 118 g. (1.2 mol) of anhydrous potassium acetate and 234 g. (2 mol) of thiazolidine-2,4-dione are dissolved at 100° C. in the course of 15 minutes in 750 ml. of glacial acetic acid. The reaction mixture is then left to cool to 75° C., and 126 g. (0.9 mol) of 5-nitrofurfural dissolved in 250 ml. of acetic acid are then added all at once and the resulting reaction mixture heated at 115° C. for 45 minutes. After cooling, the solution is poured onto 4 kg. of ice and left overnight at room temperature. The precipitate is filtered by suction, washed with ethanol and dried at 100° C. under reduced pressure to constant weight since the product contains 1 mol of solvent of crystallisation. The product weighed 165 g. (yield 76.5%). The M.P. is 225° C.

The same product can also be obtained quantitatively from 5-(5'-nitrofurfurylidene)-pseudothiohydantoin prepared as described in Example 27 (see below) by treating 1 g. of this product on a boiling water bath for 4 hours, with stirring, with 20 ml. of 6 N hydrochloric acid.

(B) 12 g. (0.05 mol) of 5-(5'-nitrofurfurylidene)-thiazolidine-2,4-dione are suspended in 75 ml. of pure ethanol and treated at 0° C. with a solution of 2.8 g. (0.05 mol) of pure potassium hydroxide in 50 ml. of pure ethanol. The reaction mixture is allowed to return to room temperature, and stirring continued for 2 hours. The precipitate of the potassium derivative is filtered by suction, washed with a little ethanol and dried. The product weighed 13.6 g. (yield 98%). M.P. (decomposition) = 290° C.

EXAMPLE 11

Compound 10744 and its potassium salt (A) 234 g. (2 mols) of thiazolidine-2,4-dione are added to a solution of 196 g. (2 mols) of potassium acetate in 800 ml. of acetic acid at 90° C. This temperature is maintained until the product has dissolved; 167 g. (1 mol) of β-(5-nitrofuryl-2)-acrolein in solution in 400 ml. of acetic acid are then added. The temperature is raised to 120° C. and held for one hour. Precipitation, which is abundant whilst still hot, is completed upon cooling. The filtered precipitate is washed with a little acetic acid, then with water and alcohol and finally recrystallised from about 700 ml. of dimethylformamide. After prolonged drying in a heated oven at 100° C. under reduced pressure it melts at 260° C.; 146 g. of this product are obtained (yield 55%).

(B) 106 g. (0.4 mol) of the product prepared as described above are suspended in 500 ml. of pure ethanol and treated at 0° C. with 22.4 g. (0.4 mol) of pure potassium hydroxide in solution in 500 ml. of ethanol. After 2 hours' stirring at room temperature the precipitate of the potassium salt is separated by suction filtration and dried. 120 g. of this product are obtained (yield 99%), M.P. (decomposition)=325° C.

EXAMPLE 12

Compound 11137

2.34 g. (0.02 mol) of thiazolidine-2,4-dione are dissolved in a solution of acetic acid containing 2 g. of potassium acetate in 8 ml. of acetic acid at about 90° C. When solution is complete, 2.46 g. (0.01 mol) of 2-bromo-3-(5'-nitro-furyl-2')-acrolein in solution in 6 ml. of acetic acid are added and the reaction mixture is heated under reflux for one hour. After standing overnight at room temperature, the precipitate is separated by suction filtration, washed with a little dimethylformamide, then with ethanol and dried. The product weighed 1.2 g. (yield 35%). M.P.=260° C.

EXAMPLE 13

Compound 10933

(A) 3.93 g. (0.03 mol) of 3-methyl-thiazolidine-2,4-dione in solution in 4 ml. of acetic acid are added to 4.23 g. (0.03 mol) of 5-nitrofurfural in 4 ml. of acetic acid and 5.9 g. (0.06 mol) of anhydrous potassium acetate in 12 ml. of acetic acid. The mixture is heated at 125° C. for one hour and left overnight. The precipitate thus obtained is removed by suction filtration, washed with acetic acid, water and then ethanol and finally recrystallised from dioxane. 2.33 g. (yield 31%) of a deep yellow powder melting at 208° C. are thus obtained.

(B) 1 g. (0.036 mol) of the potassium derivative of 5-(5'-nitrofurfurylidene)-thiazolidine-2,4-dione prepared as described in Example 10 is treated with 0.85 g. (0.06 mol) of methyl iodide in 10 ml. of dimethylformamide on a water bath until the reagents have gone into solution and the potassium iodide formed has completely precipitated; the dimethylformamide is then evaporated under reduced pressure, the residue treated with water and the water filtered off, and the precipitate is then recrystallised from dioxane. 0.86 g. (yield 94%) of a yellow product which melts at 211 to 212° C. is thereby obtained.

(C) 2.7 g. (0.01 mol) of 2-methylimino-3-methyl-5(5' - nitrofurfurylidene)-thiazolidine-4-one the preparation of which is described in Example 29, are treated with 50 ml. of concentrated hydrochloric acid under reflux for 7 hours. The insoluble portion is removed by suction filtration of the hot solution, washed with water and dried. It weighs 0.8 g. and melts at 210° C.; the acid solution contains unhydrolysed starting material in the form of the hydrochloride. The product which melts at 210° C. is identical with that obtained as described under A and B.

Analogous products which carry, in the 3-position, an ethyl (11064), β-chloroethyl (11080), isopropyl (11071), allyl (10829), n-hexyl (11076), propynyl (11245), n-pentyl (11246), n-heptyl (11248), n-octyl (11250) or n-hexadecyl (11252) group as well as those which carry a 2'-(5'' - nitrofurfurylidene)ethylidene group in the 5-position and, in the 3-position, a methyl (10934), ethyl (11065), isopropyl (11072), allyl (10830), n-hexyl (11077), n-pentyl (11247), n-heptyl (11249), n-octyl (11251) or n-hexadecyl (11253) group are obtained by the same processes using the appropriately substituted thiazolidine - 2,4 - diones as starting materials with in process B the appropriate alkyl or propynyl iodide and in process C the appropriate 2-methylimino - 3 - alkyl-5-substituted thiazolidine-4-ones.

EXAMPLE 14

Compound 11078

1.3 g. (0.012 mol) of ethyl chloroformate is added, with cooling on an ice bath, to a suspension of 2.78 g. (0.01 mol) of the potassium salt prepared as described in Example 10 in 25 ml. of dimethylformamide. After one hour in the cold, the solvent is evaporated under reduced pressure at 70° C. and the residue is treated with water and recrystallised from ethanol.

The product obtained in this way melts at 123–124° C. and, after drying, weighs 1.67 g. (yield 51%).

EXAMPLE 15

Compound 10827

(A) 8.4 g. (0.06 mol) of 5-nitrofurfural are added to a solution of 13.2 g. (0.06 mol) of 3-ethoxycarbonylmethylene thiazolidine - 2,4 - dione in 20 ml. of acetic acid, and 15 g. of anhydrous potassium acetate in solution in 30 ml. of acetic acid are then added at 60° C. After a few minutes' heating on a water bath at 90° C., an exothermic reaction ensues and copious precipitation takes place. After prolonged cooling, the mass is treated with water and the solid present separated by suction filtration, washed with ethanol and then recrystallised from 7 ml. of dimethylformamide, removed by suction filtration, washed with alcohol and dried under reduced pressure. 8.5 g. of product are obtained (yield 43%), M.P.=180–181° C.

(B) 7 g. (0.025 mol) of the potassium salt of 5(5'-nitrofurfurylidene)-thiazolidine - 2,4 - dione obtained as described in Example 10 are treated with 6.12 g. (0.05 mol) of ethyl chloroacetate in 40 ml. of dimethylformamide on a boiling water bath for one hour. After removal of the dimethylformamide under reduced pressure and treatment with water, the precipitate obtained is separated by suction filtration, washed with ethanol and recrystallised from acetic acid. 7 g. of product (yield 86%) are thereby obtained. M.P.=181–182° C.

EXAMPLE 16

Compound 10828

This product is obtained by one or other of the two methods described in the preceding example, substituting β-(5-nitrofuryl-2)-acrolein for 5-nitrofurfural in part A or the potassium salt obtained as described in Example 11 for that of Example 10 in part B. The two samples obtained in this way both melt at 150° C.

EXAMPLE 17

Compound 11067

2.78 g. (0.01 mol) of the potassium salt the preparation of which is described in Example 10, 1 g. (0.0105 mol) of monochloroacetic acid and 25 ml. of dimethylformamide are heated at 90° C. for 3 hours. After concentration of the solvent under reduced pressure and treatment with water, the residue is separated by suction filtration and recrystallised from 250 ml. of water. 1.5 g. (yield 50%) of a product which melts at 115° C. is thus obtained.

EXAMPLE 18

Compound 11079

The method described in the preceding example is repeated using the potassium salt obtained in Example 11, to give the desired product in 66% yield. It melts at 245° C.

EXAMPLE 19

Compound 10946

6.4 g. (0.028 mol) of 3-(3'-ethoxycarbonyl - 2 - propenyl)-thiazolidine - 2,4 - dione and 4 g. of 5-nitrofurfural (0.028 mol) in solution in 6 ml. of pure acetic acid are treated with 5.5 g. (0.056 mol) of potassium acetate in solution in 11 ml. of acetic acid at 95° C. After 2 hours at room temperature and treatment with water, the precipitate is isolated and recrystallised from acetic acid. It has M.P.=154° C. and 2.36 g. is obtained (yield 24%).

This product can also be obtained by heating the potassium salt described in Example 10 with ethyl γ-bromocrotonate.

EXAMPLE 20

Compound 10947

Replacing 5-nitrofurfural used in the preceding example by a molar equivalent of β-(5-nitrofuryl-2)-acrolein, a small yield of the desired product is obtained. The yield is almost quantitative, however, when the potassium salt obtained as described in Example 11 is heated with ethyl γ-bromo-crotonate dissolved in dimethylformamide and proceeding as described in Example 15(B). This product melts at 173° C.

EXAMPLE 21

Compound 10787

18 g. (0.075 mol) of 5(5'-nitrofurfurylidene)-thiazolidine - 2,4 - dione prepared as described in Example 10 are dissolved in 75 ml. of dimethylformamide at 70° C. 0.5 ml. of piperidine are added thereto, followed by 13 ml. of 37% formaldehyde (0.15 mol). After two more minutes at 70° C. the reaction mixture is allowed to stand at room temperature for 12 hours, the solution poured on 300 ml. of a mixture of water and ice containing 10 ml. of 37% formaldehyde. The precipitate which is obtained is separated by suction filtration, washed with 1% aqueous formaldehyde, separated by suction filtration and dried in the presence of phosphorus pentoxide under reduced pressure at 100° C. The dry product weighs 15 g. (yield 74%). When heated at progressively increasing temperatures, it loses one equivalent of formaldehyde from 120° C. upwards to yield the starting material.

EXAMPLE 22

Compound 10932

0.86 ml. (0.01 mol) of 35% formaldehyde are added at 80° C. to 1.33 g. (0.005 mol) of 5[2' - (5" - nitrofurfurylidene)ethylidene]-thiazolidine - 2,4 - dione in solution in 12 ml. of dimethylformamide. After 10 minutes at 75° C., the solution is left to stand overnight at room temperature and then treated with 3 volumes of a mixture of ice and water; the solid formed is separated by suction filtration, washed with a little 1% aqueous formaldehyde and then dried under reduced pressure in the presence of phosphorus pentoxide.

The product obtained in this way weighs 1 g. (yield 68%). It loses formaldehyde when heated above 120° C.

EXAMPLE 23

Compound 10985

1.33 g. (0.005 mol) of 5[2'-(5"-nitrofurfurylidene) ethylidene]-thiazolidine-2,4-dione in suspension in 25 ml. of ethanol is treated with 0.45 ml. (slight excess) of formaldehyde in a 35% aqueous solution and with 0.055 mol of 15% ethanolic dimethylamine. After stirring for one hour at room temperature, the precipitate is separated by suction filtration, washed with a little ethanol and dried at 100° C. under reduced pressure. It weighs 1.2 g. and melts at 175° C.

Operating in a similar manner in dioxane or in dimethylformamide as solvents, the analogous compounds which carry, in the 3-position, a diethylaminomethyl (11136), bis(β-hydroxyethyl) - aminomethyl (11003), pyrrolidinomethyl (11000), piperadinomethyl (11004), morpholinomethyl (10889), piperazinomethyl (11075) or 4-(β-hydroxyethyl)-piperazinomethyl (11066) group as well as those which carry a 5'-nitrofurfurylidene group in the 5-position and, in the 3-position, a dimethylamino methyl (11001), bis-(β - hydroxyethyl) - aminomethyl (10988), pyrrolidinomethyl (1099), piperidinomethyl (10989) or morpholinomethyl (10888) group are obtained from the two starting compounds prepared as described in Examples 10 and 11 and substituting the appropriate secondary amines for dimethylamine.

EXAMPLE 24

Compound 10677

9.8 g. (0.05 mol) of the hydrochloride of 3-(β-aminoethyl) - thiazolidine - 2,4-dione in solution in 50 ml. of acetic anhydride are heated at 140° C. for 3 hours; the solvent is then evaporated under reduced pressure and the acetyl derivative obtained is recrystallised from water. 6.35 g. are obtained. M.P.=116° C.

2.02 g. (0.01 mol) of this derivative and 141 g (0.01 mol) of 5-nitrofurfural in solution in 10 ml. of pure ethanol are treated with 2.94 g. (0.03 mol) of potassium acetate in solution in 10 ml. of pure acetic acid and the whole is heated to boiling on a water bath for 4 hours. The solid which has precipitated is filtered after the reaction mixture has been allowed to cool and is recrystallised from ethanol. It is a yellow product which melts at 182° C. and weighs 0.9 g.

0.8 g. of this condensation product and 20 ml. of 4 N-hydrochloric acid are heated under reflux for 4-hours. After one night in the refrigerator, the hydrochloride is separated by suction filtration, washed with a little ice water and dried. It weighs 0.6 g. The instantaneous melting point is 205° C.

EXAMPLE 25

Compound 10741

This product is obtained from the hydrochloride of 3-(β-aminoethyl) - thiazolidine-2,4-dione and β-(5-nitrofuryl-2)acrolein by the process described in Example 24. It is soluble in cold water to the extent of 4 g. per litre. The instantaneous melting point is 220° C.

EXAMPLE 26

Compound 10831

5.56 g. (0.02 mol) of the potassium salt of 5(5'-nitrofurfurylidene)-thiazolidine-2,4-dione the preparation of which is described in Example 10, and 3.16 g. (0.025 mol) of benzyl chloride in 50 ml. of dimethylfarmamide are heated on a boiling water bath for 3 hours. After evaporation of the solvent under reduced pressure and treatment with water, the residue is removed by suction filtration and recrystallized from acetic acid. 5 g. (yield 76%) of the product which melts at 201° C. are thus obtained.

A similar compound which carries a para-nitrobenzyl group in the 3-position (10833) (from para-nitrobenzyl chloride) and those which carry a 2'-(5"-nitrofurfurylidene)ethylidene group in the 5-position and, in the 3-position, a benzyl group (10832) or a para-nitrobenzyl group (10834) are obtained in the same manner from the potassium salts described in Examples 10 and 11.

EXAMPLE 27

Compound 10746

1.67 g. (0.01 mol) of β-(5-nitrofuryl-2)-acrolein in solution in 5 ml. of acetic acid is added to a solution of 2.44 g. (0.025 mol) of anhydrous potassium acetate and 1.16 g. (0.01 mol) of pseudothiohydantoin in 10 ml. of acetic acid at 70° C. The whole reaction mixture is kept on a water bath at this temperature for 6 hours. After prolonged cooling, the precipitate is separated by suction filtration, washed with acetic acid, then with water and lastly with ethanol and dried; the dark brown solid product thus obtained weighs 1.52 (yield 57%): it is recrystallised from dimethylformamide. In the pure state, it is an orange yellow solid which melts with decomposition at abou 300° C.

EXAMPLE 28

Compound 11141

2 g. of anhydrous potassium acetate are dissolved in 8 ml. of pure acetic acid; 1.3 g. (0.01 mol) of 3-methyl-2-imino-thiazolidine-4-one is then dissolved therein and then, after the addition of 1.41 g. (0.01 mol) of 5-nitrofurfural in solution in 2 ml. of acetic acid, this solution is heated on a water bath at 60° C. for 15 minutes. After cooling, the solid formed is removed by suction filtration, washed with a little acetic acid, then water and lastly with ethanol and dried. It can be recrystallised from dimethyl formamide. 2.45 g. (yield 97%) of the product is obtained, M.P.=259-260° C.

Compound 11142 which melts at 224-225° C. is obtained by replacing 5-nitrofurfural by a molar equivalent of β-(5-nitrofurfuryl-2)-acrolein in the above example.

EXAMPLE 29

Compound 11025

A solution of 1.41 g. (0.01 mol) of 5-nitrofurfural, 1.44 g. (0.01 mol) of 2-methylimino-3-methyl-thiazolidine-4-one and 1.9 g. (0.02 mol) of anhydrous potassium acetate in 9 ml. of acetic acid is heated at 60° C. for 7 minutes. The orange yellow precipitate which forms is separated by suction filtration after complete cooling, and washed with water and ethanol. 2.08 g. (yield: 75%) are thereby obtained. M.P.=238° C.

This product may be recrystallised from dimethylformamide; the product obtained is greenish yellow. M.P.=240° C.

Analogous compounds which have an allyl group in the 3-position and an allylimino group in the 2-position (10983) or a phenyl group in the 3-position and a phenylimino group in the 2-position (10986) as well as those which have a 2'-(5''-nitrofurfurylidene)ethylene group in the 5-position and, in the 3-position and 2-position, methyl, methyl and methylimino groups respectively (11026), or allyl and allylimino groups respectively (10984) are obtained under similar conditions but with longer time of heating starting with the correspondingly substituted thiazolidine-4-ones and in the two latter cases, β-(5-nitrofuryl-2)-acrolein.

EXAMPLE 30

Compound 11002

1.96 g. (0.02 mol) of anhydrous potassium acetate dissolved in 4 ml. of acetic acid, and then 1.41 g. (0.01 mol) of 5-nitrofurfural in solution in 3 ml. of acetic acid, are added to 1.92 g. (0.01 mol) of 2-phenylimino-thiazolidine-4-one in solution in 3 ml. of acetic acid. The solution is heated on a water bath at 75° C. for 2 hours 30 minutes. After cooling to room temperature, the solid which separates is isolated by suction filtration, washed with water and then with alcohol, and recrystallised from dimethylformamide. When dried the product weighs 1.3 g. (yield 41%) and melts at 315° C.

The corresponding compound carrying an ortho-chlorophenylimino group in the 2-position (11005) (using 2-(orthochlorophenylimino-thiazolidine-4-one) or that which which has a 2'-(5''-nitrofurfurylidene) ethylidene group in the 5-position and a phenylimino group in the 2-position (11019) (using β-(5-nitrofuryl-2) acrolein) is obtained by the same method.

EXAMPLE 31

Compound 11022

0.5 ml. of 35% formaldeyhde (slight excess) and 0.44 g. (0.005 mol) of distilled morpholine are added successively to 1.57 g. (0.005 mol) of 2-phenylimino-5(5'-nitroforfurylidene)thiazolidine-4-one (the preparation of which is described in Example 30) in suspension in 10 ml. of dimethylformamide.

Substantially complete solution is effected by heating for ½ hour on a water bath at 85° C. and is followed by copious precipitation. After standing overnight at room temperature, the solid which forms is separated by suction filtration, washed with alcohol and then dried at 100° C. under reduced pressure. It weights 1.8 g. (yield 87%) and has an instantaneous melting point of 225° C.

The corresponding compound which has a 2'-(5''-nitrofurfurylidene) ethylidene group in the 5-position (11023) (using 2-phenylimino-5(5'-nitrofurfurylidene)ethylidene) thiazolidine-4-one and that which carries an ortho-chlorophenylimino group in the 2-position and a 5'-nitrofurfurylidene group in the 5-position (11024) (using 2-(ortho-chlorophenylimino)-5-(5'-nitrofurfurylidene)thiazolidine-4-one) are obtained by applying the same technique.

EXAMPLE 32

Compound 11058

1.19 g. (0.005 mol) of 2-(para-toluene-sulphonylimino)thiazolidine-4-one, 0.705 g. (0.005 mol) of 5-nitrofurfural and 0.98 g. (0.01 mol) of potassium acetate are dissolved in 6 ml. of acetic acid and heated on a water bath at 60° C. for 20 minutes. After cooling, the product is separated by suction filtration, washed with acetic acid, water and then ethanol and dried. It weighs 1.3 g. (yield: 66%) and melts at 267° C.

The corresponding compound carrying a benzenesulphonyl imino group in the 2 position (11060) (starting from 2-benzene-sulphonylimino)-thiazolidine-4-one) and the compounds which carry a 2'-(5''-nitrofurfurylidene) ethylidene group in the 5-position and, in the 2-position, a para-toluene-sulphonyl-imino group (11059 or a benzenesulphonylimino group (11061) can be obtained in the same manner starting from β-(5-nitrofuryl-2)-acrolein and the stated thiazolidine-4-ones.

EXAMPLE 33

Compound 11073

0.87 g. (0.005 mol) of the semicarbazone of thiazolidine-2,4-dione in suspension in a solution of 15 ml. of acetic acid containing 1 g. of potassium acetate is treated with 0.84 g. (0.0005 mol) of β-(5-nitrofuryl-2)-acrolein for 30 minutes under reflux and with stirring. After the precipitate which forms has been cooled, it is filtered, washed with acetic acid and with ethanol and dried under reduced pressure. This product melts at 248° C.

EXAMPLE 34

Compound 11074

3.28 g. (0.02 mol) of 2-guanidinyl thiazolidine-4-one, 2.82 g. (0.02 mol) of 5-nitrofurfural and 3.92 g. (0.04 mol) of anhydrous potassium acetate are dissolved in 60 ml. of pure acetic acid. A precipitate is formed after heating on a water bath at 65° C. for one hour. It is separated by suction filtration after cooling the reaction mixture, washed with ethanol and then dried. 4.18 g. (yield: 71%) of the product is obtained which melts at 366° C.

EXAMPLE 35

Compound 11139

4 g. of anhydrous potassium acetate are dissolved in 16 ml. of acetic acid and 2.6 g. (0.02 ol) of 2-methylamino-thiazoline-4-one and 2.84 g. (0.02 mol) of 5-nitrofurfural are added thereto. The solution obtained is heated for 2 hours at 80° C. on a water bath. After cooling a solid which separates is isolated by filtration and recrystallised from a small amount of dimethylformamide; it weighs 1.2 g. and melts at 328° C.

The products which carry, in the 2-position, an ethylamino group (11062), allylamino (11171), n-propylamino (11143), isopropylamino (11173), n-butylamino (11175) or cyclohexylamino (11177) are obtained by replacing the 2-methylamino thiadolidine-4-one by the appropriate 2-alkylamino, 2-cycloalkylamino or 2-alkenylamino derivative, and compounds 11140 (2-methylamino), 11063 (2-ethylamino), 11172 (2-allylamino), 11144 (2-n-propylamino), 11174 (2-isopropylamino), 11176 (2-n-butylamino) and 11178 (2-cyclohexylamino) are obtained by replacing 5-nitrofurfural by $\beta$-(5-nitrofuryl)-2)acrolein in the above described process. Starting from 2-methylamino-, 2-ethylamino-, 2-isopropylamino- and 2-cyclohexylamino-thiazoline-4-ones and $\alpha$-bromo-$\beta$-(5-nitrofuryl-2)-acrolein, the compounds 11376, 11138, 11377 and 11378, respectively, are obtained.

EXAMPLE 36

Compound 11020

1.1 g. (0.0078 mol) of 5-nitrofurfural, 1.6 g. (0.0078 mol) of 2-benzylamino-thiazoline-4-one and 1.5 g. of anhydrous potassium acetate are successively dissolved by heating in 5 ml. of acetic acid and heating is continued at 65° C. for 2 hours on a water bath. After prolonged heating and treatment with water, the precipitate is removed by suction filtrate, washed with ethanol and recrystallised from a small amount of dimethylformamide. It weighs 1 g. (yield: 39%) and melts at 254° C.

By following the above described process, the corresponding compounds which have a para-chlorobenzylamino (11254), dimethylamino (11262), diethylamino (11273, 11390 and 11391), methylbenzylamino (11274), methylphenylamino (11276) or morpholino (11292) group in the 2-position may be obtained using as starting materials the correspondingly 2-substituted thiazoline-4-ones. Those which have a 2'-(5''-nitrofurfurylidene)ethylidene group in the 5-position and, in the 2-position, a benzylamino (11021), para-chloro-benzylamino (11255), diethylamino (11263 and 11389), methylbenzylamino (11275), methylphenylamino (11291) or morpholino (11293) group are similarly obtained from $\beta$-(5-nitrofuryl-2) acrolein and the corresponding 2-substituted amino-thiazoline-4-ones. The homologous compound (11379) is obtained from $\alpha$-bromo,$\beta$-(5-nitrofuryl-2)-acrolein and 2-benzylamino-thiazoline-4-one.

EXAMPLE 37

Compound 12004

(a) 15.5 g. (0.1 mol) of thiazolidine-2,4-dione potassium salt suspended in 60 ml. of anhydrous dimethylformamide are treated with 18.8 g. (0.1 mol) of 1,2-dibromoethane on a boiling water-bath with stirring for 4 hours. Potassium bromide is separated by suction filtration, the solvent driven off in vacuo, the residual oil treated with water, extracted with chloroform, dried over magnesium sulphate then distilled; 16.40 g. of 3-$\beta$-bromoethyl-thiazolidine-2,4-dione are obtained (yield 73%) $BP_{0.05\ mm.}=125-130°$ C.; $n_D^{25}=1.5778$.

(b) 6.46 g. (0.066 mol) of anhydrous potassium acetate, 7.4 g. (0.033 mol) of 3-$\beta$-bromoethyl-thiazolidine-2,4-dione and 4.65 g. (0.033 mole) of 5-nitrofurfural are dissolved successively in 30 ml. of anhydrous acetic acid on a water-bath at 90° C.

Heating is continued at this temperature for 3 hrs. 30 min. After prolonged cooling, the precipitate is separated by suction filtration in vacuo, washed with a little ethanol and dried in an oven at 60° C. By adding a mixture of equal parts of ethanol and ice to mother liquors, a second crop is obtained, isolated in the same manner as the first one and added thereto. The product is purified by recrystallisation from benzene in the presence of animal charcoal. The yellow product thus obtained melts at 134° C. and after drying weighs 6 g. (yield 52%).

EXAMPLE 38

2.78 g. (0.01 mol) of 5-(5'-nitrofurfurylidene)-thiazolidine-2,4-dione potassium salt prepared according to Example 10 and 3.76 g. (0.02 mol) of 1,2-dibromethane in 25 ml. of dimethylformamide are kept on a water-bath with stirring at 100° C. for 3 hours. After removing the solvent in vacuo, the residue is treated with water; the precipitate is separated by suction filtration, dried and recrystallized, from benzene in the presence of animal charcoal. The product thus obtained weighs 1.65 g. (yield 48%) and melts at 132–133° C. It is the same as the product obtained according to Example 37.

EXAMPLE 39

Compound 12003

(a) 3-$\gamma$-chloropropyl-thiazolidine-2,4-dione is obtained in the same conditions as the $\beta$-bromoethyl homologue according to Example 37 by treating thiazolidine-2,4-dione potassium salt with 1-bromo-3-chloropropane in stoichiometric amount. The yield of distilled product is 88%. BP 0.05 mm.=130–134° C.

(b) By substituting 3-$\gamma$-chloropropyl-thiazolidine-2,4-dione for 3-$\beta$-bromoethyl-thiazolidine-2,4-dione in Example 37 in an equivalent amount (6.40 g.; 0.033 mol) and using the same reaction conditions, compound 12003 melting at 160° C. can be obtained.

The same compound may also be obtained as in Example 38 by treating 5-(5'-nitrofurfurylidene)-thiazolidine-2,4-dione with an equivalent of 1-bromo-3-chloropropane. The product thus obtained melts at 158° C. and is the same as the product obtained by condensing 5-nitrofurfural with thiazolidine-2,4-dione previously substituted in the 3-position.

The compounds prepared according to the examples were subjected to biological tests, the results of which will now be described.

(1) Antibacterial action in vitro: The technique employed in the study of the products is the inhibition of growth by serial dilutions in Petri dishes containing agar medium.

Into each Petri dish are introduced 2 ml. of the intermediate range of products and 18 ml. of molten agar, and the dish is heated to 50° C. When the agar has set, the surface is dried at 37° C. The cultures, of 21 strains of bacteria and of 44 strains cultivated for 18 hours in ordinary broth are diluted to 1/100 in distilled water and used for inoculation. The dishes after turning upside down are warmed to 37° C. in a heating cupboard for 24 hours and the readings are then taken.

(2) Action against Moch Bacillus in vitro:

The liquid medium used for the tests on the serum was Youmans medium which was placed in tubes measuring 22 mm., in portions of 5 ml. per tube. The substance to be tested is distributed among the tubes in such a way that the concentrations range from 10 mcg. to 0.05 mg. per ml. The medium is inoculated with the *Mycobacterium tuberculosis* H 37 R V strain from a culture 7 to 9 days old on Dubos medium, carrying out two inoculations (0.01 mg. of bacilli and 0.1 mg. per 5 ml. of medium).

The culture is titrated by nephelometry, comparing the culture in Dubos medium with that of a range covering a series of suspensions of B.C.G.

Readings are taken on the sixth, twelfth and eighteenth day. The bacteriostatic concentration is taken as that concentration which prevents the appearance of a culture which is visible to the naked eye on the sixth day after inoculation with 0.01 mg.

The reading taken on the eighteenth day, especially that with the 0.1 mg. inoculation, enables one to have an approximate estimate of the number of resistant bacilli present in a normal strain.

(3) Antifungal activity in vitro: Study of the antifungal properties of the products of the present invention was carried out by inoculation with different fungi and yeasts of a Sabouraud medium containing dilutions of the products ranging from 0.5 to 30 mcg. per ml. of solidified medium. The reading was taken after the specimen had been in a heating cupboard at 27° C. for 5 days.

(4) Antiparasiticidal action in vivo:

(a) *Hymenolepis nana* var. *Fraterna*: Eight weeks old mice were given 100 eggs by the oral route. Four weeks later, the animals were treated with the test material for three days. Twenty-four hours after the last treatment, the mice were sacrificed and the percentage of deparasitisation noted.

(b) *Syphacia obvelate*: Four weeks old mice were left in contact with strongly parasitised mice for eight days. The animals were then treated with the test material by the oral route for 4 days.

Forty-eight hours after the last treatment, the mice were sacrificed and the percentage of deparasitisation noted.

(c) *Nippostrongylus muris*: Three to four weeks old rats were given 200 larvae of Nippostrongylus subcutaneously. On the tenth, eleventh and twelfth day after inoculation, the animals were treated orally.

On the fourteenth day after inoculation, they were sacrificed and the number of adult parasites counted. The following formula gives the percentage of deparasitisation:

$$\frac{N-n}{N} \times 100$$

N and $n$ being the mean number of worms found in the control animals and the treated animals, respectively.

(5) Urinary excretion of the products in the rat: The method of Hartley, modified by Chabbert (1957) was used for biological dosage. It consists in horizontal diffusion from discs impregnated with urine on an agar medium inoculated with the test bacteria.

The percentage of excretion is calculated from the reading of the zone of inhibition of growth of the bacteria in relation to a range of the product. Graphs are drawn up in which the concentrations are entered as abscissae and the diameters of the range as ordinates. The activity of the sample to be studied is read directly from the graph obtained in this way. The specimens of urine were taken one, two, four, six, eight and twenty-four hours after a single dose of the product.

(6) Intestinal antiseptic action in the healthy rat: The excrements of control animals and of animals treated with the test compounds are mixed with distilled water to a known volume by stirring.

From this solution, which is considered the parent solution, dilutions of between $10^{-3}$ and $10^{-8}$ are prepared. 1 millilitre of each dilution is filtered through a millipore filter of $0.45\mu$ and the filter is placed on an agar medium. After 24 hours at 37° C., the number of colonies per filter are counted. The excrements are taken for analysis twentyfour hours before the first treatment, twentyfour hours after treatment, at the third treatment, at the seventh treatment and three days after the treatment.

The number of colonies in each dilution after administration of the product to be examined is expressed as a percentage of the corresponding number before administration.

(7) Intestinal antiseptic action in the rat infected with *Salmonella typhimurium*: The procedure is the same as that described above but the animals are orally 1 ml. of an 18 hour culture of *Salmonella typhimurium* mixed with 1 ml. of egg yoke.

The filters are placed on a special *Salmonella shigella* (S.s.) medium. Dilutions of the excrements are $10^{-2}$, $5 \times 10^{-2}$ and $10^{-3}$.

(8) Determination of the acute toxicity in mice by the intraperitoneal or oral route: The results obtained with the biological tests described above are shown in the following tables, numbered 1 to 8.

TABLE 1.—ANTIBACTERIAL ACTION IN VITRO

[Minimum inhibiting concentrations in mcg./ml.]

| | 10743 | 10744 | 10137 | 10933 | 10934 | 11064 | 11080 | 11065 |
|---|---|---|---|---|---|---|---|---|
| Staphyloccus londonii | ≤0.05 | ≤0.05 | 1.56 | 0.4 | 0.8 | 0.4 | 0.8 | 0.8 |
| Staphylococcus aureus 521 IP | 0.2 | 0.2 | | | | 1.56 | 1.56 | 12.5 |
| Streptococcus pyogenes gr. A 561 IP | 3.12 | 1.56 | | | 50 | 25 | 3.12 | >50 |
| Streptococcus agalactiae gr. B 55 118 IP | 3.12 | 3.12 | | 25 | 50 | 25 | 3.12 | >50 |
| Streptococcus faecalis gr. D A 23 | 3.12 | 1.56 | 1.56 | | | 12.5 | 6.25 | 50 |
| Sarcina lutea ATCC 9 341 | 1.56 | 3.12 | | 6.25 | 50 | 12.5 | 12.5 | 50 |
| Bacillus cereus ATCC 9 634 | 1.56 | 0.4 | | 3.12 | 1.56 | 1.56 | 1.56 | 1.56 |
| Bacillus subtilis ATCC 6 633 | 0.4 | 0.8 | | | | 0.8 | 0.8 | 6.25 |
| Listeria monocytogenes 5 734 | 1.56 | 1.56 | | 6.25 | 12.5 | 12.5 | 6.25 | 25 |
| Corynebacterium, abbott | | | | | | 12.5 | 12.5 | 50 |
| Past. septica type C 5621 | 0.1 | 0.1 | | 0.4 | 0.1 | 1.56 | 1.56 | 25 |
| Past. pseudo tuberculosis C 114 | 0.4 | 3.12 | | 3.12 | 1.56 | 25 | 12.5 | 50 |
| Esch. coli A 223 IP | 3.12 | 6.25 | | 12.5 | 3.12 | 25 | 25 | 50 |
| Esch. coli F 260 | 0.1 | 1.56 | | | | 50 | 50 | 50 |
| Esch. coli Monod D 198 | 1.56 | 0.8 | | 6.25 | 1.56 | 25 | 25 | 50 |
| Klebsiella pneumoniae ATCC 10 031 | 3.12 | 6.25 | | 6.25 | 0.4 | 1.56 | 3.12 | 0.8 |
| Klebsiella mistral E 156 | | | | | | 50 | 50 | >50 |
| Salmonella typhimurium A 222 IP | 6.25 | 6.25 | 6.25 | 50 | 6.25 | 50 | 50 | >50 |
| Salmonella para B E 118 | 3.12 | 3.12 | | | | 50 | 50 | >50 |
| Shigella dysenteriae 5 728 IP | 1.56 | 3.12 | | 6.25 | 1.56 | 25 | 12.5 | 50 |
| Pseudomonas aeruginosa A 22 IP | >50 | >50 | | >50 | 25 | 50 | 50 | >50 |

| | 11071 | 11072 | 10829 | 10830 | 11076 | 11077 | 11078 | 10827 |
|---|---|---|---|---|---|---|---|---|
| Staphylococcus londonii | 0.2 | 3.12 | 0.2 | ≤0.05 | 0.2 | 0.1 | 0.1 | 0.4 |
| Staphylococcus aureus 521 IP | 0.8 | 25 | | | 0.4 | 0.4 | 0.8 | |
| Streptococcus pyogenes gr. A561 IP | 6.25 | >50 | | | 0.2 | 12.5 | 12.5 | |
| Streptococcus agalactiae gr. B 55 118 IP | 6.25 | >50 | | | 0.2 | 12.5 | 12.5 | |
| Streptococcus faecalis gr. DA 23 | 6.25 | >50 | | | 0.8 | 6.25 | 12.5 | |
| Sarcina lutea ATCC 9 341 | 12.5 | >50 | | | 0.8 | 50 | >50 | |
| Bacillus cereus ATTC 9 634 | 0.8 | 25 | 3.12 | 25 | 0.4 | 0.4 | 0.4 | 12.5 |
| Bacillus subtilis ATCC 6 633 | 0.2 | 12.5 | | | 0.2 | 0.1 | 0.1 | |
| Listeria monocytogenes 5 734 | 3.12 | 50 | | | 0.8 | 3.12 | 12.5 | |
| Corynebacterium Abbott | 25 | >50 | | | 0.4 | 50 | 50 | |
| Past. septica type C 5621 | 1.56 | 50 | 0.4 | 1.56 | 50 | 0.8 | 1.56 | 1.56 |
| Past. pseudo tuberculosis C 114 | 12.5 | 50 | | | 50 | 12.5 | 3.12 | |
| Esch. coli A 223 IP | 50 | 50 | >50 | >50 | >50 | 1.56 | 12.5 | >50 |
| Esch. coli F 260 | 50 | >50 | | | >50 | 3.12 | 12.5 | |
| Esch. coli Monod D 198 | 25 | >50 | | | >50 | 3.12 | 12.5 | |
| Klebsiella pneumoniae ATCC 10 031 | 6.25 | >50 | 6.25 | 3.12 | 50 | 12.5 | 12.5 | >50 |
| Klebsiella mistral E 156 | | | | | | | | |
| Salmonella typhimurium A 222 IP | 50 | >50 | >50 | >50 | >50 | 12.5 | 50 | >50 |
| Salmonella para BE 118 | 50 | >50 | | | >50 | 12.5 | 12.5 | |
| Shigella dysenteriae 5 728 IP | 12.5 | 50 | 12.5 | 25 | 50 | 25 | 12.5 | |
| Pseudomonas aeruginosa A 22IP | >50 | >50 | | | >50 | >50 | >50 | |

TABLE 1—Continued

| | 10828 | 11067 | 11079 | 10946 | 10947 | 10787 | 10932 | 10985 |
|---|---|---|---|---|---|---|---|---|
| Staphyloccocus londonii | 0.4 | 0.2 | ≤0.05 | 0.8 | 0.4 | 0.1 | ≤0.05 | ≤0.05 |
| Staphylococcus aureus 521 IP | | 0.8 | 0.1 | | | 0.4 | | 0.2 |
| Streptococcus pyogenes gr. A 561 IP | | 6.25 | 0.8 | | | 2.12 | 1.56 | 1.56 |
| Streptococcus agalactiae gr. B 55 118 IP | | 6.25 | 1.56 | | | 3.12 | 1.56 | 1.56 |
| Streptococcus faecalis gr. DA 23 | | 12.5 | 0.8 | | | 0.2 | 1.56 | 1.56 |
| Sarcina lutea ATCC 9 341 | | 50 | 12.5 | | | 3.2 | 12.5 | 6.25 |
| Bacillus cereus ATCC 9 634 | 3.12 | 6.25 | ≤0.05 | 50 | 50 | 1.56 | 0.2 | ≤0.05 |
| Bacillus subtilis ATCC 6 633 | | 0.8 | ≤0.05 | | | 0.1 | 1.56 | ≤0.05 |
| Listeria monocytogenes 5 734 | | 3.12 | 0.4 | | | 1.56 | 0.8 | 0.4 |
| Corynebacterium abbott | | 25 | 12.5 | | | | | 25 |
| Past. septica type C 5621 | 3.12 | 1.56 | 0.2 | 12.5 | 6.25 | 0.1 | ≤0.05 | 0.4 |
| Past. pseudo tuberculosis C 114 | | 25 | 1.56 | | | 1.56 | 3.12 | 1.56 |
| Esch. coli A 223 IP | >50 | 6.25 | 0.4 | >50 | >50 | 3.12 | 0.8 | 0.8 |
| Esch. coli F 260 | | 12.5 | 0.8 | | | 3.12 | | 1.56 |
| Esch. coli monod D 198 | | 6.25 | 0.8 | | | 3.12 | 0.8 | 0.8 |
| Klebsiella pneumoniae ATCC 10 031 | 3.12 | 12.5 | 1.65 | 50 | 50 | 3.12 | 6.25 | 1.56 |
| Klebsiella mistral E 156 | | 50 | 3.12 | | | | | 6.25 |
| Salmonella typhimurium A 222 IP | >50 | 25 | 1.56 | >50 | >50 | 6.25 | 1.56 | 3.12 |
| Salmonella para BE 118 | | 12.5 | 1.56 | | | 3.12 | 6.25 | 3.12 |
| Shigella dysenteriae | 50 | 6.25 | 1.56 | 50 | 50 | 1.56 | 0.4 | 3.12 |
| Pseudomonas aeruginosa A 22 IP | | >50 | >50 | | | >50 | 50 | >50 |

| | 11001 | 11136 | 10988 | 11003 | 10999 | 11000 | 10989 | 11004 |
|---|---|---|---|---|---|---|---|---|
| Staphyloccocus londonii | 0.1 | ≤0.05 | 0.1 | ≤0.05 | 0.4 | ≤0.05 | 0.2 | ≤0.05 |
| Staphylococcus aureus 521 IP | 0.4 | 0.2 | 0.8 | 0.2 | 0.8 | 0.2 | 0.8 | 0.2 |
| Streptococcus pyogenes gr. A 561 IP | 3.12 | 1.56 | 3.12 | 1.56 | 6.25 | 3.12 | 6.25 | 3.12 |
| Streptococcus agalactiae gr. B 55 118 IP | 3.12 | 1.56 | 3.12 | 1.56 | 6.25 | 1.56 | 6.25 | 3.12 |
| Streptococcus faecalis gr. DA 23 | 3.12 | 1.56 | 3.12 | 1.56 | 12.5 | 1.56 | 12.5 | 1.56 |
| Sarcina lutea ATCC 9 341 | 50 | 12.5 | 25 | 25 | 50 | 50 | 50 | 50 |
| Bacillus cereus ATCC 9 634 | 0.4 | 0.05 | 0.2 | 0.2 | 0.8 | 0.1 | 3.12 | 0.1 |
| Bacillus subtilis ATTCC 633 | 0.1 | ≤0.05 | 0.4 | ≤0.05 | 0.4 | ≤0.05 | 0.2 | ≤0.05 |
| Listeria nonocytogenes 5 734 | 0.8 | 0.4 | 1.56 | 0.4 | 3.12 | 0.4 | 1.56 | 0.4 |
| Corynebacterium abbott | 50 | 3.12 | 50 | 50 | 50 | 50 | 50 | 50 |
| Past. Septica type C 5621 | 1.56 | 0.2 | 0.4 | 0.8 | 3.12 | 0.8 | 1.56 | 1.56 |
| Past. pseudo tuberculosis C114 | 1.56 | 3.12 | 1.56 | 3.12 | 6.25 | 3.12 | 3.12 | 0.8 |
| Esch. coli A 223 IP | 1.56 | 1.56 | 1.56 | 0.4 | 6.25 | 0.8 | 3.12 | 1.56 |
| Esch. coli F 260 | 1.56 | 1.56 | 3.12 | 0.8 | 6.25 | 0.8 | 6.25 | 0.8 |
| Esch. coli Monod D 198 | 1.56 | 0.8 | 3.12 | 0.8 | 6.25 | 0.8 | 6.25 | 1.56 |
| Klebsiella pneumoniae ATCC.10 031 | 3.12 | 1.56 | 3.12 | 1.56 | 12.5 | 0.8 | 6.25 | 1.56 |
| Klebsiella Mistral E 156 | 25 | 6.25 | 25 | 12.5 | 50 | 6.25 | 50 | 12.5 |
| Salmonella typimurium A 222 IP | 3.12 | 3.12 | 6.25 | 3.12 | 12.5 | 1.56 | 12.5 | 3.12 |
| Salmonella para BE 118 | 3.12 | 1.56 | 3.12 | 1.56 | 6.25 | 1.56 | 6.25 | 3.12 |
| Shigella dysenteriae 5 728 IP | 1.56 | 0.8 | 1.56 | 1.56 | 3.12 | 1.56 | 3.12 | 3.12 |
| Pseudomonas aeruginosa A 22 IP | >50 | >50 | 50 | >50 | >50 | 50 | 50 | >50 |

| | 10888 | 10889 | 11075 | 11066 | 10746 | 11141 | 11142 | 10125 |
|---|---|---|---|---|---|---|---|---|
| Staphylococcus londonii | 0.1 | ≤0.05 | ≤0.05 | ≤0.05 | ≤0.05 | 0.4 | 0.1 | 0 |
| Staphylococcus aureus 521 IP | 0.2 | 0.2 | 0.2 | 0.1 | 0.4 | 0.8 | 0.4 | 0.8 |
| Streptococcus pyogenes gr. A 561 IP | 1.56 | 0.4 | 1.56 | 0.8 | 6.25 | >50 | 0.8 | 25 |
| Streptococcus agalactiae gr. B 55 118 IP | 1.56 | 0.8 | 1.56 | 0.8 | 6.25 | >50 | 0.8 | 25 |
| Streptococcus faecalis gr. DA 23 | 1.56 | 0.8 | 1.56 | 0.8 | 12.5 | >50 | 3.12 | 25 |
| Sarcina lutea ATCC 9 341 | 6.25 | 6.25 | 25 | 12.5 | 3.12 | 15 | 12.5 | 25 |
| Bacillus cereus ATCC 9 634 | 1.56 | 0.4 | 0.1 | ≤0.05 | 0.8 | 3.12 | 0.1 | 1.56 |
| Bacillus subtilis ATCC 6 633 | 0.1 | ≤0.05 | ≤0.05 | ≤0.05 | 0.8 | 0.2 | ≤0.05 | 0.4 |
| Listeria monocytogenes 5 734 | 0.4 | 0.4 | 0.4 | 0.4 | 1.56 | 12.5 | 0.8 | 1.56 |
| Corynebacterium abbott | 12.5 | 6.25 | 12.5 | 12.5 | | 6.25 | 12.5 | 12.5 |
| Past septica type C 5621 | ≤0.06 | ≤0.05 | 0.4 | 0.4 | 0.1 | 0.8 | 0.8 | 1.56 |
| Past pseudo tuberculosis C 114 | 6.25 | 3.12 | 1.56 | 12.5 | 0.8 | 0.8 | 0.2 | 1.56 |
| Esch. coli A 223 IP | 3.12 | 1.56 | 0.8 | 0.8 | 0.8 | 3.12 | 0.4 | 12.5 |
| Esch Coli F 260 | 1.56 | 1.56 | 0.8 | 3.12 | 1.56 | 3.12 | 3.12 | 12.5 |
| Esch. coli mond D 198 | 1.56 | 0.8 | 0.8 | 0.8 | 1.56 | 3.12 | 0.8 | 6.25 |
| Klebsiella pneumoniae ATCC 10 031 | 3.12 | 1.56 | 1.56 | 1.56 | 0.2 | 0.2 | ≤0.05 | 0.1 |
| Klebsiella mistral E 156 M | 1.56 | 1.56 | | 6.25 | | 12.5 | 0.8 | 25 |
| Salmonella typimurium A 222 IP | 3.12 | 3.12 | 1.56 | 3.12 | 1.56 | 3.12 | 3.12 | 25 |
| Salmonella para BE 118 | 1.56 | 1.56 | 1.56 | 3.12 | 1.56 | 6.25 | 1.56 | 25 |
| Shigella dysenteriae 5 728 IP | 1.56 | 0.4 | 3.12 | 3.12 | 0.4 | 0.8 | 0.2 | 3.12 |
| Pseudomonas aeruginosa A 22 IP | >50 | 50 | >50 | >50 | >50 | >50 | >50 | 50 |

| | 11026 | 10983 | 10984 | 10986 | 11002 | 11019 | 11005 | 11022 |
|---|---|---|---|---|---|---|---|---|
| Staphylococcus londonii | ≤0.05 | 0.8 | 1.56 | 1.56 | 0.10 | ≤0.05 | 0.2 | 0.2 |
| Staphylococcus aureus 521 IP | 0.4 | 3.12 | 6.25 | 50 | 3.12 | 1.56 | 0.2 | 0.8 |
| Streptococcus pyogenes gr. A 561 IP | 0.8 | >50 | >50 | 50 | 50 | 50 | 50 | 50 |
| Streptococcus agalactiae gr. B 55 118 IP | 0.8 | >50 | >50 | 50 | 50 | 50 | 50 | 50 |
| Streptococcus faecalis gr. DA 23 | 0.8 | >50 | 12.5 | >50 | 50 | 25 | 6.25 | 50 |
| Sarcina lutea ATCC 9 341 | >50 | 25 | 25 | >50 | 50 | >50 | 12.5 | >50 |
| Bacillus cereus ATCC 9 634 | 0.1 | 3.12 | 0.8 | 50 | 50 | 0.8 | 0.8 | 3.12 |
| Bacillus subtilis ATCC 6 633 | 0.1 | 3.12 | 0.8 | 1.56 | 0.4 | 0.8 | 0.2 | 1.56 |
| Listeria monocytogenes 5 734 | 0.4 | 6.25 | 3.12 | 50 | 25 | 0.8 | 0.8 | 25 |
| Corynebacterium abbott | >50 | >50 | >50 | 50 | 50 | >50 | 50 | >50 |
| Past. Septica type C 5621 | 0.8 | 25 | 25 | 50 | 50 | 50 | 3.12 | 50 |
| Past. pseudo tuberculosis C 114 | 0.4 | 50 | 50 | 50 | 50 | 50 | 12.5 | 50 |
| Esch. Coli A 223 IP | 1.56 | >50 | 50 | 50 | >50 | 50 | 25 | 50 |
| Esch. Col F 260 | 50 | >50 | >50 | 50 | >50 | 50 | 50 | 50 |
| Esch. Coli Monod D 198 | 0.8 | >50 | >50 | >50 | >50 | >50 | 50 | 50 |
| Klebsiella pneumoniae ATCC 10 031 | 50 | 12.5 | >50 | >50 | >50 | >50 | 50 | >50 |
| Klebsiella mistral E 156 | 50 | >50 | >50 | >50 | >50 | 50 | 50 | >50 |
| Salmonella typimurium A 222 IP | >50 | >50 | >50 | 50 | >50 | >50 | >50 | >50 |
| Salmonella para BE 118 | 50 | >50 | >50 | 50 | >50 | >50 | 50 | 50 |
| Shigella dysenteriae 5 728 IP | 1.56 | >50 | >50 | 25 | 50 | 50 | 12.5 | 50 |
| Pseudomonas aeruginosa A 22 IP | >50 | >50 | >50 | >50 | 50 | >50 | >50 | >50 |

| | 11023 | 11024 | 11068 | 11059 | 11060 | 11061 | 11073 | 11074 |
|---|---|---|---|---|---|---|---|---|
| Stgphyloccus Condonii | ≤0.05 | 0.1 | 3.12 | 0.2 | 6.25 | 0.4 | 0.1 | 0.1 |
| Staphylococcus aureus 521 IP | 0.8 | 0.2 | 3.12 | 0.2 | 6.25 | 0.4 | 0.2 | 0.1 |
| Streptococcus pyogenes gr. A 561 IP | 50 | >50 | 1.56 | 12.5 | 1.56 | 12.5 | 50 | 0.8 |
| Streptococcus agalactiae gr. B 55 118 IP | 50 | 50 | 1.56 | 12.5 | 1.56 | 12.5 | 50 | 0.8 |
| Streptococcus paecalis gr. DA 23 | 25 | 50 | 25 | 12.5 | 25 | 25 | 50 | 0.8 |
| Sarcina lutea ATCC 9 341 | >50 | 50 | >50 | 25 | >50 | 50 | >50 | 50 |
| Bacillus cereus ATCC 9 634 | 0.4 | 0.8 | 25 | 0.8 | 25 | 1.56 | 0.4 | 0.1 |
| Bacillus subtilis ATCC 6 633 | 0.4 | 0.4 | 50 | 3.12 | 25 | 1.56 | 0.2 | 0.1 |
| Listeria monocytogenes 5 734 | 3.12 | 1.56 | 25 | 0.8 | 25 | 3.12 | 3.12 | 25 |
| Corynebacterium abbott | >50 | 50 | 50 | 12.5 | 50 | 6.25 | 50 | 50 |
| Past. septica type C 5621 | 50 | 3.12 | 3.12 | 0.8 | 6.25 | 0.4 | 1.56 | 0.1 |

TABLE 1—Continued

| | 11023 | 11024 | 11068 | 11059 | 11060 | 11061 | 11073 | 11074 |
|---|---|---|---|---|---|---|---|---|
| *Past. pseudo tuberculosis* C 114 | 50 | 25 | 50 | 50 | 50 | 50 | 25 | 0.1 |
| *Esch. coli* A 223 IP | 50 | 50 | 50 | 50 | 50 | 25 | 25 | 0.8 |
| *Esch. coli* F 260 | 50 | 50 | >50 | 50 | 50 | 50 | 50 | 0.8 |
| *Esch. coli* Monod D 198 | >50 | 50 | >50 | >50 | >50 | 50 | 50 | 0.8 |
| *Klebsiella pneumoniae* ATCC 10 031 | >50 | 50 | >50 | >50 | >50 | 6.25 | 50 | 0.05 |
| *Klebsiella Mistral* E 156 | >50 | >50 | 50 | >50 | 50 | >50 | | |
| *Salmonella typhimurium* A 222 IP | >50 | 50 | >50 | >50 | 50 | >50 | 50 | 50 |
| *Salmonella para* BE 118 | >50 | 50 | >50 | >50 | 50 | >50 | 50 | 50 |
| *Shigella dysenteriae* 5 728 IP | 50 | 25 | 25 | 25 | 25 | 25 | 25 | 50 |
| *Pseudomonae aeruginosa* A 22 IP | >50 | >50 | >50 | >50 | >50 | >50 | >50 | >50 |

| | 11139 | 11140 | 11062 | 11063 | 11138 | 11171 | 11172 | 11143 |
|---|---|---|---|---|---|---|---|---|
| *Staphyloccocus londonii* | ≤0.05 | ≤0.05 | ≤0.05 | ≤0.05 | ≤0.05 | ≤0.05 | ≤0.05 | ≤0.05 |
| *Staphylococcus aureus* 521 IP | ≤0.05 | ≤0.05 | 0.1 | ≤0.05 | ≤0.05 | ≤0.05 | ≤0.05 | 0.2 |
| *Streptococcus pyogenes* gr. A 561 IP | 0.2 | 0.4 | 0.1 | 0.2 | 0.2 | 0.1 | 0.1 | 0.2 |
| *Streptococcus agalactiae* gr. B55 118 IP | 0.2 | 0.4 | 0.1 | 0.2 | 0.2 | 0.1 | 0.1 | 0.2 |
| *Streptococcus paecalis* gr. DA 23 | 0.8 | 0.4 | 0.4 | 0.2 | 0.2 | 0.4 | 0.1 | 0.8 |
| *Sarcina lutea* ATCC 9 341 | 1.56 | 1.56 | 3.12 | 1.56 | 0.2 | 1.56 | 1.56 | 12.5 |
| *Bacillus cereus* ATCC 9 634 | ≤0.05 | ≤0.05 | ≤0.05 | ≤0.05 | 0.1 | 0.1 | ≤0.05 | 0.1 |
| *Bacillus subtilis* ATCC 6 633 | ≤0.05 | ≤0.05 | 0.1 | ≤0.05 | ≤0.05 | 0.2 | ≤0.05 | ≤0.05 |
| *Listeria monocytogenes* 5 734 | 0.8 | 0.2 | 0.8 | 0.2 | 0.2 | 0.4 | 0.1 | 0.8 |
| *Corynebacterium abbott* | 0.8 | 1.56 | 3.12 | 1.56 | 0.2 | 3.12 | 3.12 | 3.12 |
| *Past. Septica* type C 5621 | 0.4 | 0.2 | 0.8 | 0.4 | 0.2 | 0.4 | 0.4 | 0.8 |
| *Past. pseudo tuberculosis* C 114 | ≤0.05 | 0.4 | 0.8 | 1.56 | 0.1 | 0.4 | 0.4 | 0.8 |
| *Esch. coli* A 223 IP | 0.2 | 0.2 | 0.8 | 0.4 | ≤0.05 | 0.8 | 0.4 | 3.12 |
| *Esch. coli* F 260 | 0.4 | 0.4 | 0.8 | 0.8 | 0.4 | 1.56 | 0.8 | 3.12 |
| *Esch. coli* Monod D 198 | 0.4 | 0.2 | 0.8 | 0.4 | 0.2 | 1.56 | 0.8 | 3.12 |
| *Klebsiella pneumoniae* ATCC 10 031 | ≤0.05 | ≤0.05 | 0.2 | ≤0.05 | ≤0.05 | 0.2 | ≤0.05 | 0.4 |
| *Klebsiella mistral* E 156 | 0.8 | 0.8 | 3.12 | 1.56 | 0.4 | 12.5 | 3.12 | 12.5 |
| *Salmonella typhimurium* A 222 IP | 0.4 | 0.4 | 0.8 | 0.8 | 0.4 | 3.12 | 0.8 | 6.25 |
| *Salmonella para* BE 118 | 0.4 | 0.4 | 1.56 | 0.8 | 0.8 | 1.56 | 0.8 | 6.25 |
| *Shigella dysenteriae* 5 728 IP | 0.4 | 0.2 | 0.8 | 0.4 | 0.2 | 1.56 | 0.8 | 3.12 |
| *Pseudomonae Aeruginosa* A 22 IP | 50 | 50 | >50 | >50 | >50 | 50 | 50 | >50 |

| | 11144 | 11173 | 11174 | 11175 | 11276 | 11177 | 11178 | 11020 |
|---|---|---|---|---|---|---|---|---|
| *Staphyloccocus londonii* | ≤0.05 | 1.56 | ≤0.05 | 0.1 | 0.05 | 0.8 | ≤0.05 | ≤0.05 |
| *Staphylococcus aureus* 521 IP | 0.1 | 6.25 | 0.1 | 0.4 | 0.2 | 6.25 | 0.8 | 0.2 |
| *Streptococcus pyogenes* gr. A 561 P | 0.2 | 12.5 | 0.4 | 0.8 | 0.8 | 25 | 0.8 | 0.4 |
| *Streptococcus agalactiae* gr. 5 B55 118 P | 0.4 | 6.25 | 0.4 | 0.8 | 0.8 | 25 | 0.8 | 0.4 |
| *Streptococcus faecallis* gr. DA 23 | 0.4 | 12.5 | 0.4 | 1.56 | 0.8 | 25 | 3.12 | 0.4 |
| *Sarcina lutea* ATCC 9 341 | 25 | 50 | 6.25 | 12.5 | 3.12 | 50 | 3.12 | 25 |
| *Bacillus cereus* ATCC 9 634 | ≤0.05 | 3.12 | ≤0.05 | 0.4 | ≤0.05 | 3.12 | 0.1 | 0.8 |
| *Bacillus subtilis* ATCC 6 633 | ≤0.05 | 1.56 | ≤0.05 | 0.2 | ≤0.05 | 1.56 | ≤0.05 | 0.4 |
| *Listeria monocytogenes* 5 734 | 0.4 | 6.25 | 0.4 | 0.8 | 0.2 | 12.5 | 0.8 | 0.4 |
| *Corynebacterium abbott* | 1.56 | 50 | 3.12 | 6.25 | 6.25 | 50 | 1.56 | >50 |
| *Past. Septica* type C 5621 | 0.4 | 1.56 | 0.4 | 1.56 | 0.8 | 1.56 | 1.56 | 6.25 |
| *Past. pseudo tuberculosis* C 114 | 1.56 | 6.25 | 0.8 | 3.12 | 1.56 | 12.5 | 3.12 | 25 |
| *Esch. coli* A 223 IP | 0.8 | 3.12 | 3.12 | 12.5 | 1.56 | 3.12 | 3.12 | 50 |
| *Esch. coli* F 260 | 1.56 | 6.25 | 6.25 | 12.5 | 3.12 | 12.5 | 6.25 | 50 |
| *Esch. coli* Monod D 198 | 1.56 | 3.12 | 3.12 | 6.25 | 3.12 | 6.25 | 3.12 | 50 |
| *Klebsiella pneumoniae* ATCC 10 031 | 0.1 | 6.25 | 0.2 | 0.8 | 0.2 | 6.25 | 0.05 | 6.25 |
| *Klebsiella mistral* E 156 | 3.12 | 50 | 50 | 50 | 25 | 50 | 50 | 50 |
| *Salmonella typhimurium* A 222 IP | 1.56 | 6.25 | 6.25 | 50 | 6.25 | 25 | 25 | 50 |
| *Salmonella para* BE 118 | 1.56 | 6.25 | 6.25 | 50 | 12.5 | 12.5 | 25 | 50 |
| *Shigella dysenteriae* 5 728 IP | 0.8 | 3.12 | 6.25 | 6.25 | 3.12 | 6.25 | 3.12 | 25 |
| *Pseudomonas aeruginosa* A 22 IP | >50 | >50 | >50 | >50 | >50 | >50 | >50 | >50 |

| | 11021 | 11245 | 11246 | 11247 | 11248 | 11249 | 11250 | 11251 |
|---|---|---|---|---|---|---|---|---|
| *Staphyloccocus londonii* | ≤0.05 | 1.56 | 0.4 | 1.56 | 0.2 | 12.5 | 0.4 | 12.5 |
| *Staphylococcus aureus* 521 IP | 0.2 | 6.25 | 0.8 | 25 | 6.25 | 50 | 25 | 50 |
| *Streptococcus pyogenes* gr. A 561 IP | 0.2 | 50 | 3.12 | 50 | 50 | >50 | >50 | >50 |
| *Streptococcus agalactiae* gr. B 55 118 IP | 0.2 | 50 | 0.8 | 50 | 25 | >50 | 0.8 | >50 |
| *Streptococcus faecalis* gr. DA 23 | 0.2 | 50 | 3.12 | 50 | 50 | >50 | >50 | >50 |
| *Sarcina lutea* ATCC 9341 | 3.12 | 50 | 50 | >50 | 1.56 | >50 | >50 | >50 |
| *Bacillus cereus* ATCC 9 634 | 0.2 | 6.25 | 0.8 | 6.25 | 0.2 | 25 | 3.12 | 25 |
| *Bacillus subtilis* ATCC 6 633 | 0.1 | 1.56 | 0.2 | 0.4 | 0.2 | 3.12 | 0.2 | 3.12 |
| *Lieteria monocytogenes* 5 734 | 0.4 | 25 | 0.8 | 12.5 | 0.8 | 50 | 25 | 50 |
| *Corynebacterium abbott* | 12.5 | 25 | 3.12 | >50 | 1.56 | >50 | 50 | >50 |
| *Past. Septica* type C 5621 | 1.56 | 6.25 | 1.56 | 25 | 6.25 | 50 | 25 | 50 |
| *Past. pseudo tuberculosis* C 114 | 50 | 12.5 | 50 | 50 | 50 | 50 | 50 | 50 |
| *Esch. coli* A 223 IP | 1.56 | 50 | >50 | 50 | >50 | >50 | 25 | 50 |
| *Esch. coli* F 260 | 50 | 50 | >50 | >50 | >50 | >50 | 50 | 50 |
| *Esch. coli* Monod D 198 | 3.12 | 50 | >50 | >50 | >50 | >50 | 50 | 50 |
| *Klebsiella pneumoniae* ATCC 10 031 | 0.8 | 12.5 | 3.12 | >50 | >50 | 50 | 50 | >50 |
| *Klebsiella mistral* E 156 | 50 | 50 | >50 | >50 | >50 | >50 | >50 | >50 |
| *Salmonella typhimurium* A 222 IP | >50 | 50 | >50 | >50 | >50 | >50 | >50 | >50 |
| *Salmonella para* BE 118 | >50 | 50 | >50 | >50 | >50 | >50 | 50 | >50 |
| *Shigella dysenteriae* 5 728 IP | 50 | 25 | 50 | 50 | 50 | 50 | 50 | 50 |
| *Pseudomonas aeruginosa* A 22 IP | >50 | >50 | >50 | >50 | >50 | >50 | >50 | >50 |

| | 11252 | 11254 | 11255 | 11262 | 11263 | 11273 | 11274 | 11275 |
|---|---|---|---|---|---|---|---|---|
| *Staphyloccocus londonii* | 50 | 0.1 | 0.4 | ≤0.05 | ≤0.05 | 0.4 | 0.8 | 0.2 |
| *Staphylococcus aureus* 521 IP | >50 | 0.4 | 1.56 | 0.1 | 0.1 | 0.8 | 6.25 | 0.8 |
| *Streptococcus pyogenes* gr. A 561 IP | >50 | 12.5 | 3.12 | 0.4 | 0.8 | 6.25 | >50 | 3.12 |
| *Streptococcus agalactiae* gr. B 55 118 IP | >50 | 0.8 | 1.56 | 0.2 | 0.2 | 6.25 | >50 | 1.56 |
| *Streptococcus faecalis* gr. DA 23 | >50 | 25 | 1.56 | 0.8 | 0.2 | 6.25 | >50 | 1.56 |
| *Sarcina lutea* ATCC 9341 | >50 | >50 | 50 | 3.12 | 3.12 | 12.5 | >50 | 25 |
| *Bacillus cereus* ATCC 9 634 | >50 | 0.8 | 0.8 | ≤0.05 | ≤0.05 | 0.8 | 6.25 | 0.4 |
| *Bacillus subtilis* ATCC 6 633 | >50 | 0.8 | 0.8 | ≤0.05 | ≤0.05 | 1.56 | 12.5 | 0.8 |
| *Listeria monocytogenes* 5 734 | >50 | 25 | 1.56 | 0.2 | 0.1 | 3.12 | 25 | 1.56 |
| *Cornebacterium abbott* | >50 | >50 | >50 | 3.12 | 3.12 | 25 | >50 | 25 |
| *Past. septica* type C 5621 | >50 | 0.8 | 0.8 | ≤0.05 | ≤0.05 | 0.8 | 6.25 | 0.8 |
| *Past pseudo tuberculosis* C 114 | >50 | 50 | 50 | 0.4 | 0.2 | 12.5 | 50 | 25 |
| *Esch. coli* A 223 IP | >50 | >50 | >50 | 0.8 | 0.4 | 50 | >50 | 50 |
| *Esch. coli* F 260 | >50 | >50 | >50 | 0.8 | 0.8 | 50 | >50 | 50 |
| *Esch. coli monod* D 198 | >50 | >50 | >50 | 0.8 | 0.8 | 50 | >50 | 50 |
| *Klebsiella pnemoniae* ATCC 10 031 | >50 | >50 | 50 | 0.2 | 0.1 | 50 | >50 | >50 |
| *Klebsiella minstral* E 156 | >50 | >50 | >50 | 0.8 | 0.8 | 50 | >50 | >50 |
| *Salmonella typhimurium* A 222 IP | >50 | >50 | >50 | 0.8 | 0.8 | >50 | >50 | >50 |
| *Salmonella para* BE 118 | >50 | >50 | >50 | 1.56 | 0.8 | 50 | >50 | >50 |
| *Shigella dysenteriae* 5 728 IP | 50 | 50 | 50 | 0.8 | 0.8 | 25 | >50 | 50 |
| *Pseudomonas aeruginosa* A 22 IP | >50 | >50 | >50 | 50 | 50 | >50 | >50 | >50 |

TABLE 1—Continued

|  | 11276 | 11291 | 11292 | 11293 | 10453 | 10679 | 10682 | 10741 |
|---|---|---|---|---|---|---|---|---|
| *Staphylococcus londonii* | 0.4 | 0.2 | ≦0.05 | ≦0.05 | 0.4 | 0.2 | 0.2 | ≦0.05 |
| *Staphylococcus aureus* 521 IP | 0.8 | 0.4 | 0.2 | 0.1 | | | | |
| *Streptococcus pyogenes* gr. A 561 IP | 25 | 1.56 | 1.56 | 1.56 | | | | |
| *Streptococus algalactiae* gr. B 55 118 IP | 25 | 1.56 | 0.4 | 0.4 | | | | |
| *Streptococcus faecalis* gr. DA 23 | 25 | 1.56 | 1.56 | 0.4 | | | | |
| *Sarcina lutea* ATCC 9 341 | 25 | 50 | 6.25 | 3.12 | | | | |
| *Bacillus cereus* ATCC 9634 | 1.56 | 0.4 | 0.2 | 0.1 | 0.4 | 1.56 | ≦0.05 | 3.12 |
| *Bacillus subtillis* ATCC 6 633 | 3.12 | 0.1 | ≦0.05 | ≦0.05 | | | | |
| *Listeria monocytogenes* 5 734 | 6.25 | 0.8 | 0.8 | 0.2 | | | | |
| *Corynebacterium abbott* | 12.5 | 50 | 12.5 | 3.12 | | | | |
| *Past. septica* Type C 5 621 | 1.56 | 0.4 | 0.1 | ≧0.05 | 0.4 | 0.8 | 0.1 | 0.2 |
| *Past. pseudo tuberculosis* C 114 | 50 | 50 | 0.8 | 0.8 | | | | |
| *Esch. coli* A 223 IP | 50 | >50 | 6.25 | 1.56 | 6.25 | >50 | 50 | 12.5 |
| *Esch. coli* F 260 | 50 | >50 | 12.5 | 3.12 | | | | |
| *Esch. coli* Monod D 198 | >50 | >50 | 6.25 | 3.12 | | | | |
| *Klebsiella pneumoniae* ATCC 10 031 | >50 | 6.25 | 1.56 | 0.8 | 6.25 | 50 | >50 | 1.56 |
| *Klebsiella mistral* E 156 | >50 | 50 | 50 | 6.25 | | | | |
| *Salmonella typhimurium* A 222 IP | >50 | >50 | 12.5 | 3.12 | 25 | 6.25 | 6.25 | 12.5 |
| *Salmonella para* BE 118 | >50 | >50 | 12.5 | 3.12 | | | | |
| *Shigella dysenteriae* 5 728 IP | 25 | 50 | 3.12 | 3.12 | 12.5 | 6.25 | 3.12 | 1.56 |
| *Pseudomonas aeruginosa* A 22 IP | >50 | >50 | >50 | 50 | | | | |

|  | 10290 | 10291 | 10452 | 10683 | 10743 |
|---|---|---|---|---|---|
| *Staphylococcus londonii* | 0.2 | 0.2 | ≦0.05 | 0.1 | ≦0.05 |
| Staphylococcus 209 IP | 3.12 | >50 | 0.1 | 0.4 | 0.2 |
| *Staphylococcus aureus gervais* D 319 | >50 | >50 | 0.1 | 0.8 | 0.8 |
| *Staphylococcus aureus* E 120 | >50 | >50 | 0.1 | 0.4 | 0.4 |
| *Staphylococcus albus* P C 1 200 | 0.2 | 3.12 | ≦0.05 | 0.1 | 0.2 |
| *Streptococcus pyogenes* gr. A 561 IP | 3.12 | 6.25 | 0.1 | 0.1 | 3.12 |
| *Streptococcus pyogenes* gr. A D 313 | 3.12 | 6.25 | 0.1 | 0.4 | 3.12 |
| *Streptococcus agalactiae* gr. B | 12.5 | 12.5 | 0.2 | 0.8 | 3.12 |
| *Streptococcus pyogenes* gr. C | 12.5 | 12.5 | 0.2 | 1.56 | 3.12 |
| *Streptococcus faecalis* var. Zymogenes | >50 | >50 | 0.8 | 0.8 | 3.12 |
| *Streptococcus faecalis* gr. D 5 434 IP | >50 | >50 | 0.2 | 3.12 | 3.12 |
| *Streptococcus faecalis* gr. D F 262 | >50 | >50 | 1.56 | 0.8 | 3.12 |
| *Sarcina lurea* ATCC 9341 | >50 | >50 | 0.4 | 0.8 | 1.56 |
| *Listeria monocytogenes* 5 844 IP | >50 | >50 | 0.4 | 0.4 | 1.56 |
| *Listeria monocytogenes* Ramisse type IV | | | | | |
| *Listeria monocytogenes* Joubert E 102 | | | | | |
| *Erysipelothrix insidiosa* E 159 | | | | | |
| *Erysipelothrix insidiosa* A 27 | | | | | |
| *Bacillus gereus* ATCC 10 702 | 0.8 | 0.8 | ≦0.05 | 0.1 | 0.4 |
| *Bacillus cereus* ATCC 9 634 | 6.25 | 3.12 | 0.1 | 0.1 | 0.4 |
| *Bacillus subtilis* Leugar A 156 | 1.56 | 3.12 | 0.1 | 0.8 | 1.56 |
| *Bacillus subtilis* Searle | 12.5 | 25 | 0.4 | 0.1 | 1.56 |
| *Pasteurella septica* type B 55 129 | | | ≦0.05 | ≦0.05 | 0.4 |
| *Pasteurella septica* type C 5 621 | | | ≦0.05 | ≦0.05 | 0.4 |
| *Pasteurella pseudotuberculosis* C 114 | | | 1.56 | 0.8 | 0.4 |
| Pasteurella Joubert E 99 | | | 1.56 | 1.56 | 0.8 |
| *Escherichia coli* A 223 IP | | | 3.12 | 3.12 | 3.12 |
| *Escherichia coli* Monod D 198 | | | 1.56 | 3.12 | 1.56 |
| *Escherichia coli* 111 B4 A | | | 1.56 | 3.12 | 3.12 |
| *Escherichia coli* 26 B6 A | | | 1.56 | 1.56 | 3.12 |
| *Escherichia coli* 55 B5 A | | | 6.25 | 3.12 | 1.56 |
| *Escherichia coli* ATCC 10 536 | | | 1.56 | 3.12 | 1.56 |
| *Klebsiella pneumoniae* E 155 | | | 3.12 | 3.12 | 3.12 |
| *Aerobacter aerogenes* E 115 | | | 3.12 | 6.25 | 6.25 |
| Citrobacter Vi ++ | | | 3.12 | 6.25 | 3.12 |
| *Salmonella typhi* O 901 | | | 3.12 | 6.25 | 3.12 |
| *Salmonella para* A 220 IP | | | 12.5 | 12.5 | 1.56 |
| *Salmonella para* B A 214 IP | | | 1.56 | 3.12 | 1.56 |
| *Salmonella pullorum gallinarim* 465 | | | 0.8 | 0.2 | 3.12 |
| *Shigella dysenteriae* 5 728 IP | | | 3.12 | 1.56 | 1.56 |
| *Shegella sonnei* D 374 | | | 0.8 | 1.56 | 1.56 |
| *Moraxella lwoffi* D | | | 50 | >50 | >50 |
| *Pseudomonas aeruginisa* B 74 | | | 50 | >50 | 50 |
| *Bordetella bronchiseptica* | | | | | |

|  | 10744 | 10933 | 10934 | 11076 | 11079 |
|---|---|---|---|---|---|
| *Staphylococcus londonii* | 0.2 | 0.8 | 0.4 | 0.4 | ≦0.05 |
| Staphylococcus 209 IP | 0.2 | 6.25 | 12.5 | 0.8 | 0.2 |
| *Staphylococcus aureus gervais* D 319 | 0.4 | 3.12 | 12.5 | 0.8 | 0.2 |
| *Staphylococcus aureus* E 120 | 0.4 | 1.56 | 1.56 | 0.8 | 0.1 |
| *Staphylococcus albus* P C 1 200 | 0.1 | 1.56 | 0.4 | 0.4 | ≦0.05 |
| *Streptococcus pyogenes* gr. A 561 IP | 1.56 | 1.56 | 50 | 0.2 | ≦0.05 |
| *Streptococcus pyogenes* gr. A D 313 | 1.56 | 1.56 | 6.25 | 0.8 | 0.2 |
| *Streptococcus agalactiae* gr. B | 3.12 | 25 | 50 | 0.2 | 1.56 |
| *Streptococcus pyogenes* gr. C | 3.12 | >50 | 50 | 0.8 | 0.2 |
| *Streptococcus faecalis* var. Zymogenes | 1.56 | >50 | 50 | 0.8 | 0.8 |
| *Streptococcus faecalis* gr. D 5 434 IP | 1.56 | 25 | 50 | 0.4 | 0.8 |
| *Streptococcus faecalis* gr. D F 262 | 1.56 | >50 | 50 | 25 | 0.8 |
| *Sarcina lutea* ATCC 9341 | 3.12 | 6.25 | 50 | 1.56 | 12.5 |
| *Listeria monocytogenes* 5 844 IP | 1.56 | 6.25 | 12.5 | 0.8 | 0.4 |
| *Listeria monocytogenes* Ramisse type IV | | 6.25 | 25 | 0.8 | 0.4 |
| *Listeria monocytogenes* Joubert E 102 | | 6.25 | 25 | 0.8 | 0.4 |
| *Erysipelothrix insidiosa* E 159 | | 0.4 | 1.56 | 0.4 | ≦0.05 |
| *Erysipelothrix insidiosa* A 27 | | 0.2 | 25 | 0.4 | ≦0.05 |
| *Bacillus cereus* ATCC 10 702 | ≧0.4 | 3.12 | 3.12 | 0.4 | ≦0.05 |
| *Bacillus cereus* ATCC 9 634 | 0.8 | 3.12 | 1.56 | 0.4 | 0.2 |
| *Bacillus subtilis* Leugar A 156 | 0.05 | 6.25 | 3.12 | 0.4 | ≦0.05 |
| *Bacillus subtilis* Searle | 0.8 | 6.25 | 3.12 | 0.4 | ≦0.05 |
| *Pasteurella septica* type B 55 129 | 1.56 | 0.2 | ≦0.05 | | ≦0.05 |
| *Pasteurella septica* type C 5 621 | 0.2 | 0.8 | 0.8 | | 0.1 |
| *Pasteurella pseudotuberculosis* C 114 | 3.12 | 3.12 | 1.56 | | 1.56 |
| Pasteurella Joubert E 99 | 1.56 | 3.12 | 1.56 | | 3.12 |
| *Escherichia coli* A 223 IP | 6.25 | 3.12 | 1.56 | | 0.8 |
| *Escherichia coli* Monod D 198 | 0.8 | 6.25 | 1.56 | | 0.8 |
| *Escherichia coli* 111 B4 A | 0.8 | 6.25 | 6.25 | | 1.56 |
| *Escherichia coli* 26 B6 A | 1.56 | 6.25 | 1.56 | | 3.12 |
| *Escherichia coli* 55 B5 A | 1.56 | 6.25 | 1.56 | | 1.56 |
| *Escherichia coli* ATCC 10 536 | 1.56 | 6.25 | 3.12 | | 0.8 |
| Klebsiella pneumoniae E 155 | 6.25 | 50 | 50 | | 12.5 |
| *Aerobacter aerogenes* E 115 | 6.25 | 6.25 | 1.56 | | 1.56 |
| Citrobacter Vi ++ | 1.56 | 12.5 | 3.12 | | 3.12 |
| *Salmonella typhi* O 901 | 3.12 | 6.25 | 3.12 | | 6.25 |

TABLE 1—Continued

| | 10744 | 10933 | 10934 | 11076 | 11079 |
|---|---|---|---|---|---|
| Salmonella para A A 220 IP | 3.12 | 25 | 25 | | 12.5 |
| Salmonella para B A 214 IP | 3.12 | 25 | 25 | | 3.12 |
| Salmonella pullorum gallinarum 465 | 6.25 | 6.25 | 3.12 | | 3.12 |
| Shigella dysenteriae 5 728 IP | 0.4 | 3.12 | 0.8 | | 0.8 |
| Shigella sonnei D 374 | 1.56 | 6.25 | 3.12 | | 1.56 |
| Moraxella lwoffi D | 50 | 50 | 50 | | 50 |
| Pseudomonas aeruginisa B 74 | >50 | >50 | 25 | | >50 |
| Bordetella bronchiseptica | | 25 | 3.12 | | 25 |

| | 10787 | 10932 | 10985 | 11001 | 11003 |
|---|---|---|---|---|---|
| Staphylococcus londonii | ≤0.05 | ≤0.05 | 0.1 | 0.2 | ≤0.05 |
| Staphylococcus 209 IP | 0.8 | 0.8 | 0.8 | 0.4 | 0.4 |
| Staphylococcus aureus gervais D 319 | 0.4 | 0.4 | 0.1 | 0.4 | 0.4 |
| Staphylococcus aureus E 120 | 0.4 | 0.2 | 0.2 | 0.4 | 0.2 |
| Staphylococcus albus P C 1 200 | 3.12 | 0.1 | 0.1 | 0.2 | |
| Streptococcus pyogenes gr. A 561 IP | 3.12 | 1.56 | 1.56 | 3.12 | |
| Streptococcus pyogenes gr. A D 313 | 1.56 | 0.2 | 0.4 | 1.56 | |
| Streptococcus agalactiae gr. B | 3.12 | 1.56 | 1.56 | 3.12 | 1.56 |
| Streptococcus pyogenes gr. C | 3.12 | 0.4 | 0.4 | 1.56 | 0.8 |
| Streptococcus faecalis var. Zymogenes | 3.12 | 1.56 | 1.56 | 3.12 | 1.56 |
| Streptococcus faecalis gr. D 5 434 IP | 3.12 | 1.56 | 1.56 | 3.12 | 1.56 |
| Streptococcus faecalis gr. D F 262 | 3.12 | 1.56 | 1.56 | 3.12 | 1.56 |
| Sarcina lutea ATCC 9341 | 3.12 | 12.5 | 50 | 50 | 25 |
| Listeria monocytogenes 5 844 IP | 1.56 | 0.8 | 1.56 | 3.12 | 0.8 |
| Listeria monocytogenes Ramisse type IV | | 0.8 | 1.56 | 3.12 | 0.8 |
| Listeria monocytogenes Joubert E 102 | | 0.8 | 1.56 | 3.12 | 0.8 |
| Erysipelothrix insidiosa E 159 | | 0.1 | ≤0.05 | 0.1 | ≤0.05 |
| Erysipelothrix insidiosa A 27 | | 0.1 | 1.56 | 12.5 | 3.12 |
| Bacillus cereus ATCC 10 702 | 0.2 | ≤0.05 | 0.1 | 0.2 | 0.1 |
| Bacillus cereus ATCC 9 634 | 0.8 | ≤0.05 | 0.4 | 0.4 | 0.1 |
| Bacillus subtilis Leugar A 156 | 0.4 | 1.56 | ≤0.05 | 0.4 | 0.1 |
| Bacillus subtilis Searle | 0.1 | 1.56 | ≤0.05 | 0.2 | 0.1 |
| Pasteurella septica type B 55 129 | 1.56 | ≤0.05 | 0.2 | 0.4 | 0.1 |
| Pasteurella septica type C 5 621 | ≤0.05 | ≤0.05 | 0.4 | 0.8 | 0.8 |
| Pasteurella pseudotuberculosis C 114 | 1.56 | 3.12 | 3.12 | 3.12 | 3.12 |
| Pasteurella Joubert E 99 | 6.25 | 6.25 | 6.25 | 6.25 | 3.12 |
| Escherichia coli A 223 IP | 3.12 | 0.4 | 0.8 | 1.56 | 0.8 |
| Escherichia coli Monod D 198 | 3.12 | 0.8 | 0.8 | 1.56 | 0.8 |
| Escherichia coli 111 B4 A | 3.12 | 1.56 | 0.8 | 3.12 | 1.56 |
| Escherichia coli 26 B6 A | 3.12 | 0.8 | 1.56 | 1.56 | 1.56 |
| Escherichia coli 55 B5 A | 3.12 | 1.56 | 1.56 | 3.12 | 3.12 |
| Escherichia coli ATCC 10 536 | 3.12 | 0.8 | 0.8 | 1.56 | 0.8 |
| Klebsiella pneumoniae E 155 | 1.56 | 6.25 | 12.5 | 25 | 12.5 |
| Aerobacter aerogenes E 115 | 12.5 | 0.8 | 1.56 | 3.12 | 0.8 |
| Citrobacter Vi ++ | 3.12 | 1.56 | 3.12 | 6.25 | 3.12 |
| Salmonella typhi O 901 | 1.56 | 6.25 | 6.25 | 6.25 | 12.5 |
| Salmonella para A A 220 IP | 3.12 | 12.5 | 25 | 6.25 | 25 |
| Salmonella para B A 214 IP | 3.12 | 6.25 | 3.12 | 12.5 | 6.25 |
| Salmonella pullorum gallinarum 465 | 3.12 | 6.25 | 6.25 | 3.12 | 12.5 |
| Shigella dysenteriae 5 728 IP | 1.56 | 0.8 | 3.12 | 1.56 | 3.12 |
| Shigella sonnei D 374 | 1.56 | 1.56 | 1.56 | 1.56 | 3.12 |
| Moraxella lwoffi D | 50 | 50 | 50 | 50 | 50 |
| Pseudomonas aeruginisa B 74 | >50 | 50 | 50 | >50 | 50 |
| Bordetella bronchiseptica | | 1.56 | 50 | 25 | 25 |

| | 11000 | 11004 | 10888 | 10889 | 11075 |
|---|---|---|---|---|---|
| Staphylococcus londonii | ≤0.05 | ≤0.05 | 0.1 | ≤0.05 | ≤0.05 |
| Staphylococcus 209 IP | 0.4 | 0.4 | 0.4 | 0.2 | 0.4 |
| Staphylococcus aureus gervais D 319 | 0.4 | 0.4 | 0.4 | 0.2 | 0.4 |
| Staphylococcus aureus E 120 | 0.2 | 0.2 | 0.4 | 0.2 | 0.2 |
| Staphylococcus albus P C 1 200 | 0.1 | 0.1 | 1.56 | 0.8 | 0.2 |
| Streptococcus pyogenes gr. A 561 IP | 1.56 | 1.56 | 1.56 | 0.4 | 0.2 |
| Streptococcus pyogenes gr. A D 313 | 0.4 | 0.4 | 0.4 | 0.1 | 0.2 |
| Streptococcus agalactiae gr. B | 3.12 | 1.56 | 1.56 | 0.8 | 1.56 |
| Streptococcus pyogenes gr. C | 0.8 | 0.8 | 1.56 | 0.8 | 0.4 |
| Streptococcus faecalis var. Zymogenes | 1.56 | 3.12 | 1.56 | 0.8 | 1.56 |
| Streptococcus faecalis gr. D 5 434 IP | 1.56 | 1.56 | 1.56 | 0.8 | 1.56 |
| Streptococcus faecalis gr. D F 262 | 1.56 | 1.56 | 3.12 | 1.56 | 1.56 |
| Sarcina lutea ATCC 9341 | 25 | 50 | 6.25 | 6.25 | 12.5 |
| Listeria monocytogenes 5 844 IP | 0.8 | 1.56 | 0.4 | 0.4 | 1.56 |
| Listeria monocytogenes Ramisse type IV | 0.8 | 1.56 | 0.4 | 0.4 | 0.8 |
| Listeria monocytogenes Joubert E 102 | 0.8 | 1.56 | 0.4 | 0.4 | 0.8 |
| Erysipelothrix insidiosa E 159 | ≤0.05 | 0.1 | 0.2 | ≤0.05 | ≤0.05 |
| Erysipelothrix insidiosa A 27 | 3.12 | 3.12 | 0.2 | 0.1 | ≤0.05 |
| Bacillus cereus ATCC 10 702 | 0.1 | 0.1 | 0.2 | ≤0.05 | ≤0.05 |
| Bacillus cereus ATCC 9 634 | ≤0.05 | 0.2 | 0.4 | ≤0.05 | 0.1 |
| Bacillus subtilis Leugar A 156 | 0.1 | 0.1 | 0.1 | ≤0.05 | ≤0.05 |
| Bacillus subtilis Searle | 0.1 | 0.1 | 0.2 | ≤0.05 | ≤0.05 |
| Pasteurella septica type B 55 129 | 0.2 | 0.8 | 1.56 | 1.56 | ≤0.05 |
| Pasteurella septica type C 5 621 | 0.8 | 0.8 | 0.1 | ≤0.05 | 0.2 |
| Pasteurella pseudotuberculosis C 114 | 6.25 | 6.25 | 1.56 | 1.56 | 3.12 |
| Pasteurella Joubert E 99 | 6.25 | 6.25 | 6.25 | 3.12 | 6.25 |
| Escherichia coli A 223 IP | 1.56 | 1.56 | 1.56 | 0.8 | 0.8 |
| Escherichia coli Monod D 198 | 0.8 | 1.56 | 1.56 | 0.8 | 1.56 |
| Escherichia coli 111 B4 A | 1.56 | 1.56 | 3.12 | 1.56 | 3.12 |
| Escherichia coli 26 B6 A | 1.56 | 1.56 | 3.12 | 1.56 | 3.12 |
| Escherichia coli 55 B5 A | 1.56 | 1.56 | 3.12 | 1.56 | 3.12 |
| Escherichia coli ATCC 10 536 | 1.56 | 0.8 | 1.56 | 0.8 | 0.8 |
| Klebsiella pneumoniae E 155 | 25 | 12.5 | 1.56 | 1.56 | 12.5 |
| Aerobacter aerogenes E 115 | 0.8 | 0.8 | 12.5 | 3.12 | 3.12 |
| Citrobacter Vi ++ | 1.56 | 6.25 | 3.12 | 1.56 | 6.25 |
| Salmonella typhi O 901 | 6.25 | 6.25 | 3.12 | 3.12 | 6.25 |
| Salmonella para A A 220 IP | 12.5 | 25 | 6.25 | 6.25 | 3.12 |
| Salmonella para B A 214 IP | 3.12 | 3.12 | 1.56 | 1.56 | 3.12 |
| Salmonella pullorum gallinarum 465 | 6.25 | 25 | 1.56 | 1.56 | 1.56 |
| Shigella dysenteriae 5 728 IP | 1.56 | 3.12 | 1.56 | 1.56 | 3.12 |
| Shigella sonnei D 374 | 1.56 | 3.12 | 1.56 | 0.8 | 0.8 |
| Moraxella lwoffi D | 50 | 50 | 50 | 50 | 50 |
| Pseudomonas aeruginisa B 74 | 50 | 50 | 50 | >50 | 50 |
| Bordetella bronchiseptica | 25 | 25 | | >50 | 50 |

TABLE 1—Continued

|  | 11066 | 10746 | 11026 | 11062 | 11063 |
|---|---|---|---|---|---|
| *Staphylococcus londonii* | ≤0.05 | 0.2 | 0.2 | ≤0.05 | ≤0.05 |
| Staphylococcus 209 IP | 0.4 | 0.8 | 1.56 | 0.2 | 0.2 |
| *Staphylococcus aureus gervais* D 319 | 0.4 | 0.8 | 1.56 | 0.2 | ≤0.05 |
| *Staphylococcus aureus* E 120 | 0.2 | 0.8 | 0.08 | ≤0.05 | ≤0.05 |
| *Staphylococcus albus* P C 1 200 | 0.1 | 0.2 | 0.2 | ≤0.05 | ≤0.05 |
| *Streptococcus pyogenes* gr. A 561 IP | 1.56 | 6.25 | 1.56 | 0.4 | 0.2 |
| *Streptococcus pyogenes* gr. A D 313 | 0.2 | 6.25 | 0.8 | 0.4 | ≤0.05 |
| *Streptococcus agalactiae* gr. B | 1.56 | 6.25 | 1.56 | 0.4 | 0.2 |
| *Streptococcus pyogenes* gr C | 0.4 | 6.25 | 1.56 | 0.4 | 0.2 |
| *Streptococcus faecalis* var. Zymogenes | 1.56 | 12.5 | 0.8 | 0.4 | 0.2 |
| *Streptococcus faecalis* var. Zymogenes | 1.56 | 12.5 | 0.8 | 0.4 | 0.2 |
| *Streptococcus faecalis* gr. D F 262 | 1.56 | 12.5 | 1.56 | 0.4 | 0.2 |
| *Sarcina lutea* ATCC 9341 | 12.5 | 3.12 | 50 | 1.56 | 0.8 |
| *Listeria monocytogenes* 5 844 IP | 1.56 | 1.56 | 1.56 | 0.4 | 0.2 |
| *Listeria monocytogenes* Ramisse type IV | 1.56 | -- | 0.4 | 0.2 | 0.2 |
| *Listeria monocytogenes* Joubert E 102 | 0.4 | -- | 1.56 | 0.4 | 0.2 |
| *Erysipelothrix insidiosa* E 159 | ≤0.05 | -- | 0.2 | 0.2 | ≤0.05 |
| *Erysipelothrix insidiosa* A 27 | ≤0.05 | -- | 0.2 | ≤0.05 | ≤0.05 |
| *Bacillus cereus* ATCC 10 702 | 0.4 | 0.4 | 0.2 | 0.1 | ≤0.05 |
| *Bacillus cereus* ATCC 9 634 | 0.4 | 0.2 | 0.2 | 0.2 | ≤0.05 |
| *Bacillus subtilis* Leugar A 156 | 0.4 | 3.12 | 0.8 | 0.1 | ≤0.05 |
| *Bacillus subtilis* Searle | 0.4 | 0.8 | 0.2 | ≤0.05 | ≤0.05 |
| *Pasteurella septica* type B 55 129 | ≤0.05 | 0.8 | -- | 0.1 | ≤0.05 |
| *Pasteurella septica* type C 5 621 | 0.4 | ≤0.05 | -- | 0.4 | 0.4 |
| *Pasteurella pseudotuberculosis* C 114 | 3.12 | 0.8 | -- | 0.4 | 0.4 |
| Pasteurella Joubert E 99 | 6.25 | 0.8 | -- | 0.4 | 0.4 |
| *Escherichia coli* A 223 IP | 0.8 | 0.8 | -- | 0.4 | 0.2 |
| *Escherichia coli* Monod D 198 | 0.8 | 1.56 | -- | 0.4 | 0.4 |
| *Escherichia coli* 111 B4 A | 1.56 | 0.8 | -- | 0.4 | 0.4 |
| *Escherichia coli* 26 B6 A | 1.56 | 1.56 | -- | 0.4 | 0.4 |
| *Escherichia coli* 55 B5 A | 1.56 | 0.8 | -- | 0.8 | 0.4 |
| *Escherichia coli* ATCC 10 536 | 0.8 | 1.56 | -- | 0.4 | 0.4 |
| *Klebsiella pneumoniae* E 155 | 12.5 | 0.8 | -- | 3.12 | 1.56 |
| *Aerobacter aerogenes* E 1 15 | 1.56 | 12.5 | -- | 0.4 | 0.4 |
| Citrobacter Vi ++ | 1.56 | 12.5 | -- | 0.4 | 0.4 |
| *Salmonella typhi* O 901 | 6.25 | 1.56 | -- | 0.4 | 0.4 |
| *Salmonella para A.* A 220 IP | 12.5 | 3.12 | -- | 3.12 | 3.12 |
| *Salmonella para B.* A 214 IP | 6.25 | 1.56 | -- | 1.56 | 0.4 |
| *Salmonella pullorum gallinarum* 465 | 6.25 | 3.12 | -- | 0.4 | 0.4 |
| *Shigella dysenteriae* 5 728 IP | 3.12 | 0.4 | -- | 0.4 | 0.4 |
| *Shigella sonnei* D 374 | 3.12 | 0.8 | -- | 0.4 | 0.2 |
| *Moraxella lwoffi* D | >50 | >50 | -- | 25 | >50 |
| *Pseudomonas aeruginisa* B 74 | >50 | >50 | -- | 50 | >50 |
| *Bordetella bronchiseptica* | 50 | -- | -- | 25 | 50 |

|  | 11020 | 11021 | 11139 | 11140 | 11144 |
|---|---|---|---|---|---|
| *Staphylococcus londonii* | 0.1 | ≤0.05 | ≤0.05 | ≤0.05 | ≤0.05 |
| Staphylococcus 209 IP | 0.4 | 0.4 | 0.2 | 0.2 | 0.2 |
| *Staphylococcus aureus Gervais* D 319 | 0.4 | 0.2 | 0.2 | 0.1 | 0.2 |
| *Staphylococcus aureus* E 120 | 0.4 | ≤0.05 | ≤0.05 | ≤0.05 | ≤0.05 |
| *Staphylococcus albus* PC 1 200 | 0.1 | ≤0.05 | ≤0.05 | ≤0.05 | 0.1 |
| *Streptococcus pyogenes* gr. A 561 IP | 0.4 | 0.2 | 0.4 | 0.4 | 0.2 |
| *Streptococcus pyogenes* gr. A D 313 | 0.8 | ≤0.05 | 0.4 | 0.4 | 0.1 |
| *Streptococcus agalactiae* gr. B | 0.4 | 0.2 | 0.2 | 0.4 | 0.2 |
| *Streptococcus pyogenes* gr. C | 0.4 | 0.2 | 0.8 | 0.4 | 0.2 |
| *Streptococcus faecalis* var. Zymogenes | 0.4 | 0.2 | 0.4 | 0.4 | 0.2 |
| *Streptococcus faecalis* gr. D 5 434 IP | 0.4 | 0.2 | 0.2 | 0.4 | 0.2 |
| *Streptococcus faecalis* gr. D F 262 | 0.8 | 0.4 | 0.4 | 0.4 | 0.4 |
| *Sarcina lutea* ATCC 9341 | 25 | 12.5 | 3.12 | 3.12 | 3.12 |
| *Listeria Monocytogenes* 5 844 IP | 0.8 | 0.2 | 0.8 | 0.2 | 0.2 |
| *Listeria monocytogenes* Ramisse type IV | 0.8 | 0.2 | 0.8 | 0.4 | 0.2 |
| *Listeria monocytogenes* Joubert E 102 | 0.8 | 0.4 | 0.8 | 0.4 | 0.2 |
| *Erysipelothrix insidiosa* E 159 | 0.8 | ≤0.05 | 0.1 | ≤0.05 | 0.1 |
| *Erysipelothrix insidiosa* A 27 | 0.1 | ≤0.05 | ≤0.05 | ≤0.05 | ≤0.05 |
| *Bacillus cereus* ATCC 10 702 | 0.2 | 0.2 | 0.1 | ≤0.05 | ≤0.05 |
| *Bacillus cereus* ATCC 9 634 | 0.1 | 0.4 | 0.1 | ≤0.05 | ≤0.05 |
| *Bacillus subtilis* Leugar A 156 | 0.8 | 0.4 | 0.1 | ≤0.05 | ≤0.05 |
| *Bacillus subtilis* Searle | 0.4 | 0.2 | 0.1 | ≤0.05 | ≤0.05 |
| *Pasteurella septica* type B 55 129 | -- | -- | ≤0.05 | ≤0.05 | ≤0.05 |
| *Pasteurella septica* type C 5 621 | -- | -- | ≤0.05 | ≤0.05 | ≤0.05 |
| *Pasteurella pseudotuberculosis* C 114 | -- | -- | 0.1 | 0.2 | 0.8 |
| Pasteurella Joubert E 99 | -- | -- | 0.2 | 0.4 | 1.56 |
| *Escherichia coli* A 223 IP | -- | -- | 0.4 | 0.2 | 0.8 |
| *Escherichia* Monod D 198 | -- | -- | 0.4 | 0.4 | 1.56 |
| *Escherichia* 111 B4 A | -- | -- | 0.8 | 0.4 | 1.56 |
| *Escherichia* 26 B6 A | -- | -- | 0.4 | 0.4 | 1.56 |
| *Escherichia* 55 B5 A | -- | -- | 0.4 | 0.4 | 1.56 |
| *Escherichia* ATCC 10 536 | -- | -- | 0.4 | 0.4 | 1.56 |
| *Klebsiella pneumoniae* E 155 | -- | -- | 0.8 | 0.8 | 3.12 |
| *Aerobacter aerogenes* E 115 | -- | -- | 0.4 | 0.4 | 1.56 |
| Citrobacter Vi ++ | -- | -- | 0.4 | 0.8 | 1.56 |
| *Salmonella typhi* O 901 | -- | -- | 0.4 | 0.8 | 3.12 |
| *Salmonella para* A A 220 IP | -- | -- | 1.56 | 1.56 | 6.25 |
| *Salmonella para* B A 214 IP | -- | -- | 0.8 | 0.8 | 3.12 |
| *Salmonella pullorum gallinarum* 465 | -- | -- | 0.4 | 0.4 | 3.12 |
| *Shigella Dysenteriae* 5 728 IP | -- | -- | 0.2 | 0.4 | 1.56 |
| *Shigella sonnei* D 374 | -- | -- | 0.4 | 0.4 | 1.56 |
| *Moraxella lwoffi* D | -- | -- | 6.25 | 25 | 25 |
| *Pseudomonas aeruginisa* B 74 | -- | -- | 25 | 50 | >50 |
| *Bordetella bronchiseptica* | -- | -- | 3.12 | 25 | 25 |

|  | 11171 | 11172 | 11262 | 12263 | 11293 |
|---|---|---|---|---|---|
| *Staphylococcus londonii* | 0.1 | ≤0.05 | ≤0.05 | ≤0.05 | ≤0.05 |
| Staphylococcus 209 IP | 0.4 | 0.2 | 0.4 | 0.2 | 0.2 |
| *Staphylococcus aureus Gervais* D 319 | 0.2 | 0.2 | 0.4 | 0.2 | 0.2 |
| *Staphylococcus aureus* E 120 | 0.2 | 0.1 | 0.1 | ≤0.05 | 0.1 |
| *Staphylococcus albus* PC 1 200 | 0.1 | 0.1 | ≤0.05 | 0.1 | 0.1 |
| *Streptococcus pyogenes* gr. A 561 IP | 0.4 | 0.4 | 0.4 | 0.4 | 0.4 |
| *Streptococcus pyogenes* gr. A D 313 | 0.4 | 0.1 | 0.8 | 0.2 | 0.1 |
| *Streptococcus agalactiae* gr. B | 0.4 | 0.4 | 0.4 | 0.4 | 0.4 |
| *Streptococcus pyogenes* gr. C | 0.8 | 0.4 | 0.4 | 0.2 | 0.4 |
| *Streptococcus faecalis* var. Zymogenes | 0.8 | 0.4 | 0.4 | 0.4 | 0.4 |
| *Streptococcus faecalis* gr. D 5 434 IP | 0.4 | 0.4 | 0.4 | 0.4 | 0.4 |
| *Streptococcus faecalis* gr. D F 262 | 0.8 | 0.4 | 0.8 | 0.4 | 0.4 |
| *Sarcina lutea* ATCC 9341 | 3.12 | 3.12 | 3.12 | 3.12 | 6.25 |

TABLE 1—Continued

| | 11171 | 11172 | 11262 | 12263 | 11293 |
|---|---|---|---|---|---|
| Listeria monocytogenes 5 844 IP | 1.56 | 0.4 | 3.12 | 3.12 | 3.12 |
| Listeria monocytogenes Ramisse type IV | 1.56 | 0.4 | 0.4 | 0.4 | 0.4 |
| Listeria monocytogenes Joubert E 102 | 1.56 | 0.4 | 0.2 | 0.4 | 0.4 |
| Erysipelothrix Insidiosa E 159 | 0.2 | 0.1 | 0.2 | 0.1 | 0.1 |
| Erysipelothrix Insidiosa A 27 | 0.2 | ≤0.05 | 0.1 | 0.1 | 0.1 |
| Bacillus cereus ATCC 10 702 | 0.2 | ≤0.05 | 0.2 | ≤0.05 | ≤0.05 |
| Bacillus cereus ATCC 9 634 | 0.2 | ≤0.05 | 0.1 | ≤0.05 | 0.1 |
| Bacillus subtilis Leugar A 156 | 0.2 | 0.1 | 0.1 | ≤0.05 | ≤0.05 |
| Bacillus subtilis Searle | 0.2 | ≤0.05 | 0.1 | ≤0.05 | ≤0.05 |
| Pasteurella Septica type B 55 129 | 1.56 | 1.56 | 0.4 | 0.4 | 0.8 |
| Pasteurella Septica type C 5 621 | 0.1 | 0.1 | ≤0.05 | ≤0.05 | ≤0.05 |
| Pasteurella pseudotuberculosis C 114 | 0.4 | 0.4 | 0.4 | 0.4 | 0.8 |
| Pasteurella Joubert E 99 | 3.12 | 0.8 | 0.8 | 1.56 | 1.56 |
| Escherichia coli A 223 IP | 3.12 | 0.8 | 0.4 | 0.4 | 3.12 |
| Escherichia coli Monod D 198 | 3.12 | 0.8 | 0.8 | 0.8 | 3.12 |
| Escherichia coli 111 B4 A | 3.12 | 1.56 | 1.56 | 1.56 | 3.12 |
| Escherichia coli 26 B6 A | 3.12 | 1.56 | 1.56 | 0.8 | 3.12 |
| Escherichia coli 55 B5 A | 3.12 | 0.8 | 1.56 | 0.8 | 3.12 |
| Escherichia coli ATCC 10 536 | 3.12 | 0.8 | 1.56 | 1.56 | 3.12 |
| Klebsiella pneumoniae E 155 | 6.25 | 1.56 | 1.56 | 0.4 | 6.25 |
| Aerobacter aerogenes E 115 | 3.11 | 0.8 | 0.8 | 0.8 | 3.12 |
| Citrobacter Vi ++ | 3.12 | 1.56 | 1.56 | 1.56 | 3.12 |
| Salmonella typhi O 901 | 3.12 | 1.56 | 1.56 | 1.56 | 3.12 |
| Salmonella para A A 220 IP | 6.25 | 6.25 | 3.12 | 3.12 | 12.5 |
| Salmonella para B A 214 IP | 3.12 | 1.56 | 3.12 | 0.8 | 3.12 |
| Salmonella pullorum gallinarum 465 | 3.12 | 1.56 | 0.8 | 0.4 | 3.12 |
| Shigella dysenteriae 5 728 IP | 1.56 | 0.4 | 0.5 | 0.4 | 3.12 |
| Shigella sonnei D 374 | 1.56 | 0.4 | 0.8 | 0.8 | 3.12 |
| Moraxella lwoffi D | 25 | 50 | 25 | 50 | 50 |
| Pseudomonas aeruginisa B 74 | 50 | >50 | 50 | 50 | >50 |
| Bordetella bronchiseptica | 25 | 25 | 25 | 25 | 25 |

TABLE 2.—ANTIBACTERIAL ACTION IN VITRO AGAINST MYCOBACTERIUM TUBERCULOSIS H 37 RV STRAIN
[Minimum inhibiting concentrations in mcg./ml.]

| Product | Inoculated with 0.1 mg., (day)— | | | Inoculated with 0.01 mg., (day)— | | |
|---|---|---|---|---|---|---|
| | 6th | 12th | 18th | 6th | 12th | 18th |
| 10289 | 2.5 | 5 | 5 | | | |
| 10290 | 0.75 | 0.75 | 0.75 | | | |
| 10291 | 0.75 | 0.75 | 0.75 | | | |
| 10385 | ≤0.05 | 0.75 | 5 | | | |
| 10387 | 0.1 | 0.75 | 1.25 | | | |
| 10580 | 10 | 10 | 10 | 1.25 | 1.25 | 2.5 |
| 10581 | 1.25 | 1.25 | 5 | 0.75 | 1.25 | 2.5 |
| 10584 | 1.25 | 10 | >10 | 0.25 | 1.25 | 1.25 |
| 10683 | 2.5 | 2.5 | 5 | 0.1 | 2.5 | 2.5 |
| 10743 | 5 | 10 | 10 | 0.75 | 2.5 | 5 |
| 10744 | 10 | 10 | 10 | 2.5 | 2.5 | 5 |
| 10933 | 0.25 | 0.75 | 1.25 | 0.15 | 0.15 | 0.25 |
| 10934 | 0.75 | 0.75 | 2.5 | 0.15 | 0.75 | 1.25 |
| 11064 | 0.75 | 1.25 | 1.25 | 0.25 | 0.75 | 0.75 |
| 11080 | 0.75 | 1.25 | 1.25 | 1.25 | 2.5 | 2.5 |
| 11065 | 2.5 | 2.5 | 2.5 | 0.25 | 0.75 | 0.75 |
| 11071 | 2.5 | 5 | 5 | 0.75 | 1.25 | 2.5 |
| 10829 | 0.75 | 0.75 | 0.75 | 0.25 | 0.75 | 0.75 |
| 10830 | 0.75 | 1.25 | 1.25 | 0.75 | 0.75 | 0.75 |
| 10827 | 1.25 | 2.5 | 2.5 | 0.75 | 1.25 | 2.5 |
| 10828 | 1.25 | 1.25 | 1.25 | 0.75 | 0.75 | 0.75 |
| 11171 | 0.75 | 2.5 | 2.5 | 0.75 | 1.25 | 1.25 |
| 11172 | 0.75 | 1.25 | 1.25 | 0.25 | 0.75 | 0.75 |
| 11143 | 1.25 | 1.25 | 1.25 | 0.15 | 0.15 | 0.15 |
| 11144 | 0.75 | 0.75 | 0.75 | 0.25 | 0.75 | 0.75 |
| 11174 | 0.75 | 0.75 | 0.75 | 0.75 | 0.75 | 0.75 |
| 11175 | 0.75 | 0.75 | 0.75 | 0.75 | 0.75 | 0.75 |
| 11176 | 0.1 | 0.25 | 0.25 | 0.75 | 0.15 | 0.15 |
| 11178 | ≤0.05 | ≤0.05 | 0.15 | ≤0.05 | ≤0.05 | 0.1 |
| 11020 | 0.75 | 0.75 | 1.25 | 0.75 | 0.75 | 0.75 |
| 11021 | 0.75 | 1.25 | 1.25 | 0.25 | 0.75 | 0.75 |
| 10946 | 1.25 | 2.5 | 2.5 | ≤0.05 | 0.15 | 1.25 |
| 10787 | 2.5 | 10 | 10 | 2.5 | 5 | 10 |
| 11000 | 5 | 5 | 10 | 2.5 | 5 | 5 |
| 10889 | 5 | 5 | 5 | 0.75 | 2.5 | 5 |
| 10831 | 0.75 | 0.75 | 0.75 | 0.25 | 0.75 | 0.75 |
| 10832 | 1.25 | 5 | 5 | 0.75 | 1.25 | 1.25 |
| 10833 | 2.5 | 2.5 | 2.5 | 0.75 | 2.5 | 2.5 |
| 10834 | 1.25 | 5 | 5 | 0.75 | 1.25 | 2.5 |
| 10746 | 10 | 10 | 10 | 0.75 | 0.75 | |
| 11141 | 0.75 | 1.25 | 1.25 | 0.15 | 0.25 | 0.75 |
| 11142 | 0.75 | 0.75 | 0.75 | ≤0.05 | 0.1 | 0.1 |
| 11025 | 0.15 | 0.25 | 0.75 | 0.1 | 0.25 | 0.25 |
| 11026 | 0.15 | 0.75 | 0.75 | 0.15 | 025 | 0.75 |
| 10983 | 2.5 | 2.5 | 2.5 | 1.25 | 2.5 | 2.5 |
| 11005 | 2.5 | 5 | 5 | 0.75 | 0.75 | 5 |
| 11024 | 2.5 | 5 | 10 | 2.5 | 2.5 | 5 |
| 11139 | 5 | 5 | 5 | 0.25 | 0.25 | 0.25 |
| 11140 | 1.25 | 1.25 | 1.25 | 0.25 | 0.75 | 0.75 |
| 11062 | 5 | >10 | >10 | 0.75 | 1.25 | 2.5 |
| 11063 | 2.5 | 2.5 | 2.5 | 0.75 | 0.75 | 0.75 |
| 11138 | 0.25 | 0.75 | 1.25 | ≤0.05 | 0.1 | 0.15 |
| 11254 | 0.75 | 0.75 | 1.25 | 0.15 | 0.75 | 0.75 |
| 11255 | 1.25 | 2.5 | 2.5 | 0.75 | 1.25 | 1.25 |
| 11262 | 0.1 | 0.25 | 0.75 | ≤0.05 | 0.25 | 0.75 |
| 11263 | 0.25 | 0.25 | 0.25 | ≤0.05 | 0.15 | 0.15 |
| 11273 | 0.75 | 0.75 | 1.25 | 0.75 | 0.75 | 0.75 |
| 11274 | 0.25 | 0.25 | 0.75 | 0.1 | 0.25 | 0.75 |
| 11275 | 5 | 10 | 10 | 5 | 5 | 5 |
| 11276 | 0.75 | 0.75 | 0.75 | 0.15 | 0.15 | 0.15 |
| 11245 | 0.25 | 2.5 | 2.5 | 0.1 | 0.75 | 0.75 |
| 11246 | 2.5 | 5 | 5 | 1.25 | 2.5 | 2.5 |
| 11247 | 2.5 | 2.5 | 2.5 | 0.25 | 2.5 | 2.5 |
| 11248 | 2.5 | 2.5 | 2.5 | 0.25 | 0.75 | 1.25 |
| 11249 | 2.5 | 2.5 | 2.5 | 2.5 | 2.5 | 2.5 |
| 11250 | 2.5 | 5 | 5 | 2.5 | 2.5 | 2.5 |
| 11251 | 5 | 5 | 5 | 1,25 | 2,5 | 5 |
| 11252 | >10 | >10 | >10 | 5 | >10 | >10 |

TABLE 3.—ANTIFUNGAL ACTIVITY IN VITRO
[Minimum inhibiting concentrations in mcg./ml.]

| | 10290 | 10289 | 10291 | 10385 | 10387 | 10453 |
|---|---|---|---|---|---|---|
| Trich. mentagrophytes 403 | >30 | >30 | >30 | >30 | >30 | >30 |
| Trich. mentagrophytes G 51 | | | | | | |
| Trich. mentagrophytes (mice) | | | | | | |
| Epiderm. flocossum E24 | | | | | | |
| Cryptococcus néoformans | | | | | | |
| Epiderm. flocossum 193 IP | 10 | 10 | 10 | 2.5 | 20 | ≤0.5 |
| Candida albicans 200 IP | 1.25 | 20 | 5 | 5 | 5 | 10 |
| Candida albicans No. 2 | | | | ≤0.5 | ≤0.5 | |
| Candida tropicalis No. 1 | | | | | | |
| Candida pseudotropicalis 2 | | | | | | |
| Candida krusei | | | | | | |
| Candida para-krusei | | | | | | |
| Microsporum gypseum D | | | | | | |
| Microsporum canis E 25 | | | | | | |

| | 10452 | 10383 | 10384 | 10743 | 10744 | 10137 |
|---|---|---|---|---|---|---|
| Trich. mentagrophytes 403 | >30 | 20 | >30 | >30 | 5 | >30 |
| Trich. mentagrophytes G 51 | | | | | | |
| Trich. mentagrophytes (mice) | | | | | | |
| Epiderm. flocossum E24 | | | | >30 | 20 | >30 |
| Cryptococcus néoformans | | | | | | |
| Epiderm. flocossum 193 IP | 25 | 5 | 5 | | | |
| Candida albicans 200 IP | >30 | 2.5 | 5 | >30 | >30 | >30 |
| Candida albicans No. 2 | | | | | | |
| Candida tropicalis No. 1 | | | | | | |
| Candida pseudotropicalis 2 | | | | | | |
| Candida krusei | | | | | | |
| Candida para-krusei | | | | | | |
| Microsporum gypseum D | | | | | | |
| Microsporum canis E 25 | | | | | | |

| | 10933 | 10934 | 11064 | 11071 | 10829 | 10827 |
|---|---|---|---|---|---|---|
| Trich. Montagrophytes 403 | 5 | 20 | 1.25 | 2.5 | 5 | 2.5 |
| Trich. Mentagrophytes G 51 | 1.25 | | 2.5 | 10 | | |
| Trich. mentagrophytes (mice) | 1.25 | | 2.5 | 10 | | |
| Epiderm. floccssum E 24 | 10 | >30 | 10 | 5 | 10 | 5 |
| Cryptococcus néoformans | 10 | | 20 | 2.5 | | |
| Epiderm. flocossum 193 IP | 5 | | 2.5 | 5 | | |
| Candida albicans 200 IP | 2.5 | ≤0.5 | 5 | 2.5 | 1.25 | 1.25 |
| Candida albicans No. 2 | 5 | | 5 | 10 | | 20 |
| Candida tropicalis No. 1 | 10 | | 20 | 30 | | 25 |
| Candida pseudotropicalis 2 | 1.25 | | 1.25 | 5 | | 1.25 |
| Candida krusei | 5 | | 10 | 30 | | 20 |
| Candida para-krusei | 10 | | 20 | 20 | | 25 |
| Microsporum gypseum D | 5 | | 5 | 5 | | |
| Microsporum canis E 25 | 5 | | 30 | 10 | | |

TABLE 3—Continued

| | 10946 | 10746 | 11141 | 11142 | 11025 | 11026 |
|---|---|---|---|---|---|---|
| Trich. mentagrophytes 403 | 20 | >30 | 2.5 | 2.5 | 5 | 20 |
| Trich. mentagrophytes G 51 | | | 1.25 | 5 | 10 | 30 |
| Trich. mentagrophytes (mice) | | | 10 | 5 | 10 | 30 |
| Epiderm. flocossum E 24 | 20 | >30 | 1.25 | 1.25 | 1.25 | 30 |
| Cryptococcus neoformans | 30 | | 1.25 | ≤0.5 | 20 | 10 |
| Epiderm. flocossum 193 IP | | | 1.25 | 5 | 1.25 | 30 |
| Candida albicans 200 IP | 1.25 | >30 | 1.25 | ≤0.5 | 1.25 | 1.25 |
| Candida albicans No. 2 | 30 | >30 | 30 | 25 | 20 | >30 |
| Candida tropicalis No. 1 | >30 | >30 | >30 | 30 | 30 | >30 |
| Candida pseudotropicalis 2 | 5 | >30 | 1.25 | ≤0.5 | 1.25 | 2.5 |
| Candida krusei | 30 | >30 | >30 | >30 | >30 | >30 |
| Candida para-krusei | >30 | >30 | 25 | 20 | 10 | >30 |
| Microsporum gypseum D | | | 2.5 | 2.5 | 10 | 25 |
| Microsporum canis E 25 | | | 5 | 5 | 1.25 | 25 |

| | 11245 | 11246 | 11262 | 11263 | 11273 |
|---|---|---|---|---|---|
| Trich. mentagrophytes 403 | 5 | 20 | 5 | 5 | 10 |
| Trich. mentagrophytes G 51 | 5 | >30 | 10 | 10 | 10 |
| Trich. mentagrophytes (mice) | 5 | >30 | 10 | 10 | 20 |
| Epiderm. flocossum E 24 | 5 | 5 | 1.25 | 5 | 20 |
| Cryptococcus neofermans | 10 | >30 | 1.25 | ≤0.5 | 20 |
| Epiderm. flocossum 193 IP | 5 | 5 | 5 | 5 | 20 |
| Candida albicans 200 IP | 1.25 | 1.25 | 10 | 2.5 | 10 |
| Candida albicans No. 2 | 5 | >30 | >30 | >30 | 20 |
| Candida tropicalis No. 1 | 10 | >30 | >30 | >30 | 25 |
| Candida pseudotropicalis 2 | 0.5 | 1.25 | 5 | 1.25 | 5 |
| Candida krusei | 30 | >30 | >30 | >30 | >30 |
| Candida para-krusei | 2.5 | >30 | >30 | 30 | 25 |
| Microsporum gypseum D | 5 | >30 | 25 | 10 | 20 |
| Microsporum canis E 25 | 5 | 5 | 1.25 | 10 | 20 |

TABLE 4.—ANTIPARASITICIDAL ACTIVITY IN VIVO

Percentage deparasitisation

| Product | Syphacia obvelata | Product | Syphacia obvelata |
|---|---|---|---|
| 10452 | 10 | 10983 | 42 |
| 10579 | 44 | 10984 | 42 |
| 10683 | 0 | 10986 | 80 |
| 10682 | 60 | 11002 | 16 |
| 10430 | 43 | 11005 | 10 |
| 10934 | 25 | 11059 | 35 |
| 11064 | 20 | 11073 | 16 |
| 11071 | 33 | 11062 | 66 |
| 11072 | 100 | 11063 | 50 |
| 10830 | 25 | 11144 | 50 |
| 11076 | 22 | | |
| 11077 | 22 | | |
| 10828 | 45 | 11246 | 55 |
| 11067 | 50 | 11247 | 70 |
| 10932 | 25 | 11248 | 70 |
| 10988 | 37 | 11250 | 25 |
| 11001 | 37 | 11251 | 55 |
| 11004 | 37 | 11254 | 30 |
| 11075 | 20 | 11255 | 10 |
| 10332 | 25 | | |

| | Nippostrongylus muris | | | Hymenolepis nana | |
|---|---|---|---|---|---|
| Product | Stronglus larvae | Young adults | Adults | Cysticercoids | Adults |
| 10542 | | | 76 | | 0 |
| 10683 | | | 0 | | 15 |
| 10934 | | | | | 25 |
| 11076 | | | 40 | | |
| 11077 | | | 52 | | |
| 10932 | 72 | 81 | 80 | 90 | 100 |
| 10985 | | | | | 87 |
| 10983 | | | | | 0 |
| 10984 | | | | | 0 |
| 11144 | | | | | 0 |

TABLE 5.—URINARY EXCRETION OF THE RAT

[Oral administration]

| | | | Active bacteriological material in the urine—Time after administration | | | | | |
|---|---|---|---|---|---|---|---|---|
| Product | Dose, mg./kg. | | 0-1 hr. | 1-2 hrs. | -24 hrs. | 4-6 hrs. | 6-8 hrs. | 8-24 hrs. |
| 10743 | 100 | Mcg./ml. urine | 1.5 | 1.3 | 0 | 0 | 0.29 | |
| | | Mcg. total | 1.2 | 1.56 | 0 | 0 | 0.17 | |
| 10744 | 100 | Mcg./ml. urine | 0.1 | 0 | 0 | 0 | 0 | |
| | | Mcg. total | 0.3 | 0 | 0 | 0 | 0 | |
| 10933 | 100 | Mcg./ml. urine | 0 | 0 | 0 | 0 | 0 | |
| | | Mcg. total | 0 | 0 | 0 | 0 | 0 | |
| 10932 | 100 | Mcg./ml. urine | 0 | 0.34 | 0.12 | 0.15 | 0.05 | |
| | | Mcg. total | 0 | 0.37 | 0.23 | 0.39 | 0.71 | |
| 11079 | 100 | Mcg./ml. urine | 0.35 | 0.27 | 0.23 | 0.8 | 0.38 | 0.076 |
| | | Mcg. total | 5.7 | 0.82 | 0.84 | 3.92 | 2.05 | 0.98 |
| 10452 | 100 | Mcg./ml. urine | 0 | 0.28 | 2.6 | 3.4 | 0 | 0 |
| | | Mcg. total | 0 | 1.85 | 3.12 | 3.74 | 0 | 0 |
| 10683 | 100 | Mcg./ml. urine | 0 | 0.58 | 4.1 | 0 | 0 | 0 |
| | | Mcg. total | 0 | 0.46 | 1.5 | 0 | 0 | 0 |

TABLE 6.—INTERNAL ANTISEPTIC ACTION

Modification of the Flora of Healthy Animals

| | | | Percentage variation in faecal germs | | | |
|---|---|---|---|---|---|---|
| Product | Dose in mg./kg. body-weight[1] | Dilution of faeces | Before administration | After 1 day | After 3 days | After 7 days | 3 days after treatment |
| 10452 | 100 | $10^{-3}$ | 100 | 12 | 38.2 | 50 | 80 |
| | | $10^{-4}$ | 100 | 25 | 20 | 20 | 70 |
| | | $10^{-5}$ | 100 | 30 | 10 | 10 | 85 |
| | | $10^{-6}$ | 100 | 0 | 0 | 0 | 100 |
| 10683 | 100 | $10^{-3}$ | 100 | 43 | 50 | 12 | 56 |
| | | $10^{-4}$ | 100 | 30 | 45 | 10 | 40 |
| | | $10^{-5}$ | 100 | 0 | 0 | 0 | 30 |
| | | $10^{-6}$ | 100 | 0 | 0 | 0 | 100 |
| Control | | $10^{-3}$ | 100 | 92 | 95 | 92 | 76 |
| | | $10^{-4}$ | 100 | 80 | 85 | 80 | 92 |
| | | $10^{-5}$ | 100 | 70 | 70 | 100 | 100 |
| | | $10^{-6}$ | 100 | | | | |
| 10746 | 100 | $10^{-3}$ | 100 | 4 | 25.2 | 20 | 42 |
| | | $10^{-4}$ | 100 | 10 | 30 | 30 | 50 |
| | | $10^{-5}$ | 100 | 0 | 10 | 20 | 50 |
| | | $10^{-6}$ | 0 | 0 | 0 | 0 | 0 |
| 11139 | 50 | $10^{-3}$ | 100 | 100 | 100 | 100 | 100 |
| | | $10^{-4}$ | 100 | 14 | 50 | 90 | 45 |
| | | $10^{-5}$ | 100 | 8 | 100 | 100 | 50 |
| | | $10^{-6}$ | 0 | 0 | 0 | 0 | 0 |
| 11140 | 50 | $10^{-3}$ | 100 | 100 | 100 | 100 | 100 |
| | | $10^{-4}$ | 100 | 100 | 80 | 40 | 37 |
| | | $10^{-5}$ | 100 | 30 | 100 | 40 | 20 |
| | | $10^{-6}$ | 100 | 25 | 25 | 60 | 60 |

TABLE 6—Continued

| Product | Dose in mg./kg. body-weight [1] | Dilution of faeces | Percentage variation in faecal germs | | | | |
|---|---|---|---|---|---|---|---|
| | | | Before administration | After 1 day | After 3 days | After 7 days | 3 days after treatment |
| 11062 | 50 | $10^{-3}$ | 100 | 100 | 100 | 100 | 100 |
| | | $10^{-4}$ | 100 | 100 | 100 | 100 | 100 |
| | | $10^{-5}$ | 100 | 0 | 10 | 70 | 35 |
| | | $10^{-6}$ | 100 | 0 | 5 | 70 | 100 |
| Control | | $10^{-3}$ | 100 | 100 | 100 | 100 | 100 |
| | | $10^{-4}$ | 100 | 100 | 100 | 100 | 80 |
| | | $10^{-5}$ | 100 | 25 | 50 | 50 | 50 |
| | | $10^{-6}$ | 100 | 10 | 50 | 50 | 50 |
| 11262 | 50 | $10^{-3}$ | 100 | 100 | 100 | 100 | 100 |
| | | $10^{-4}$ | 100 | 100 | 80 | 50 | 100 |
| | | $10^{-5}$ | 100 | 80 | 40 | 10 | 100 |
| | | $10^{-6}$ | 100 | 40 | 10 | 0 | 100 |
| 11263 | 50 | $10^{-3}$ | 100 | 100 | 100 | 100 | 100 |
| | | $10^{-4}$ | 100 | 100 | 100 | 40 | 100 |
| | | $10^{-5}$ | 100 | 70 | 30 | 0 | 40 |
| | | $10^{-6}$ | 100 | 60 | 30 | 0 | 10 |

[1] Given daily for 7 days.

TABLE 7.—INTESTINAL ANTISEPTIC ACTION

[Animals infected with *S. typhimurium*]

| Product | Dose in mg./kg. body-weight given daily for 7 days | Dilution of faeces | Percentage variation in faecal germs | | | | |
|---|---|---|---|---|---|---|---|
| | | | Before administration | After 1 day | After 3 days | After 7 days | 3 days after treatment |
| 11139 | 50 | $10^{-2}$ | 100 | 100 | 100 | 100 | 100 |
| | | $5\times10^{-2}$ | 100 | 100 | 100 | 100 | 100 |
| | | $10^{-3}$ | 100 | 100 | 100 | 100 | 100 |
| 11140 | 50 | $10^{-2}$ | 100 | 100 | 100 | 100 | 100 |
| | | $5\times10^{-2}$ | 100 | 100 | 100 | 40 | 100 |
| | | $10^{-3}$ | 100 | 100 | 100 | 10 | 100 |
| 11062 | 50 | $10^{-2}$ | 100 | 3 | 20 | 5 | 1 |
| | | $5\times10^{-2}$ | 100 | 1 | 10 | 0 | 0 |
| | | $10^{-3}$ | 100 | 0 | 0 | 0 | 0 |
| 11262 | 50 | $10^{-2}$ | 100 | 100 | 100 | 100 | 100 |
| | | 1/500 | 100 | 100 | 50 | 100 | 100 |
| | | $10^{-3}$ | 100 | 60 | 40 | 100 | 100 |
| 11263 | 50 | $10^{-2}$ | 100 | 100 | 100 | 100 | 100 |
| | | 1/500 | 100 | 100 | 100 | 50 | 30 |
| | | $10^{-3}$ | 100 | 95 | 80 | 20 | 15 |

TABLE 8.—TOXICITY IN MICE

| Product | LD₀ | | LD₅₀ | |
|---|---|---|---|---|
| | Intraperitoneal | Oral | Intraperitoneal | Oral |
| 10452 | >2 g./kg | | | |
| 10933 | >1 g./kg | >1 g./kg | | |
| 11062 | | >1 g./kg | | >5 g./kg. |
| 11063 | | >800 mg./kg | | >800 mg./kg. |
| 11139 | >1 g./kg | | | |
| 11140 | >1 g./kg | | | |

Compounds 12004 and 12003 were subjected to a search of bacteriostatic properties in vitro.

For this purpose a series of dilutions to ½ was effected in agar medium, the contents of active compound in the culture medium ranging from 0.05 to 50 micrograms (mcg.) per ml. Various microbial strains, gram+ and gram− as well, were used to inoculate the medium. After 24 hours in an oven at 37° C., the minimum inhibiting concentrations (M.I.C.) were determined.

Youmans medium was employed to study tuberculostatic activity, readings were taken on the sixth, twelfth and eighteenth day after inoculation of the medium with *Mycobacterium tuberculosis* (H37RV strain).

Table 9 shows the results obtained after 24 hours in screening tests. In the conditions of the experiment, the bacteriostatic activity of compound 12004 towards gram+ germs as well as gram− germs was medium-sized.

TABLE 9

Bacteriostatic action in vitro of compound 12004

| Gram+ germs: | M.I.C. (mcg./ml.) |
|---|---|
| Staphylococcus londonii | 1.56 |
| Staphylococcus 209 IP | 1.56 |
| Staphylococcus aureus Gervais D 319 | 3.12 |
| Staphylococcus aureus E 120 | 3.12 |
| Staphylococcus albus P C I 1 200 | 0.8 |
| Streptococcus pyogenes gr. A 561 IP | 12.5 |
| Streptococuus pyogenes gr. A D 313 | 12.5 |
| Streptococcus agalactiae gr. B | 6.25 |
| Streptococcus pyogenes gr. C | 6.25 |
| Streptococcus faecalis var. Zymogenes | 12.5 |
| Streptococcus faecalis gr. D 5 434 IP | 12.5 |
| Streptococcus faecalis gr. D F 262 | 12.5 |
| Sarcina lutea ATCC 9341 | 50 |
| Listeria monocytogenes 5 844 IP | 12.5 |
| Listeria monocytogenes Ramisse type IV | 12.5 |
| Listeria monocytogenes Joubert E 102 | 12.5 |
| Erysipelothrix insidiosa E 159 | 6.25 |
| Erysipelothrix insidiosa A 27 | 12.5 |
| Bacillus cereus ATCC 10 702 | 1.56 |
| Bacillus cereus ATCC 9 634 | 1.56 |
| Bacillus subtilis Leugar A 156 | 1.56 |
| Bacillus subtilis Searle | 1.56 |
| Pasteurella septica type B 55 129 | 3.12 |
| Pasteurella septica type C 5 621 | 3.12 |
| Pasteurella pseudotuberculosis C 114 | 12.5 |
| Pasteurella Joubert E 99 | 12.5 |
| Escherichia coli A 223 IP | 12.5 |
| Escherichia coli Monod D 198 | 6.25 |
| Escherichia coli 111 B4 A | 12.5 |
| Escherichia coli 26 B6 A | 12.5 |
| Escherichia coli 55 B5 A | 12.5 |
| Escherichia coli ATCC 10 536 | 6.25 |
| Klebsiella pneumoniae E 155 | 12.5 |
| Aerobacter aerogenes E 115 | 25 |
| Citrobacter vi ++ | 50 |
| Salmonella typhy O 901 | 50 |
| Salmonella para A A 220 IP | 50 |
| Salmonella para B A 214 IP | 50 |
| Salmonella pullorum gallinarum 465 | 50 |
| Shigella dysenteriae 5 728 IP | 12.5 |
| Shigella sonnei D 374 | 12.5 |
| Moraxella lwoffi D | 50 |
| Pseudomonas aeroginosa B 74 | >50 |
| Bordetella brunchiseptica | 50 |

As to compound 12003, the results appear in Table 10.

TABLE 10

Bacteriostatic action in vitro of compound 12003

| | M.I.C. (mcg./ml.) |
|---|---|
| Gram+: | |
| Staphylococcus londonii | 0.8 |
| Staphylococcus aureus 521 IP | 1.56 |
| Streptococcus pyogenes gr. A 561 IP | 3.12 |
| Streptococcus agalactiae gr. B 55 118 IP | 3.12 |
| Streptococcus faecalis gr. D A 23 | 25 |
| Sarcina lutea ATCC 9 341 | 25 |
| Bacillus cereus ATCC 9 634 | 1.56 |
| Bacillus subtilis ATCC 6 633 | 1.56 |
| Listeria monocytogenes 5 734 | 12.5 |
| Corynebacterium abbott | 25 |
| Gram−: | |
| Past. septica type C 5 621 | 3.12 |
| Past. pseudo tuberculosis C 114 | 25 |
| Esch. coli A 223 IP | >50 |
| Esch. coli F 260 | >50 |
| Esch. coli Monod D 198 | 50 |
| Klebiella pneumoniae ATCC 10 031 | 25 |
| Klebsiella mistral E 156 | >50 |
| Salmonella typhimurium A 222 IP | >50 |
| Salmonella para B E 118 | >50 |
| Shigella dysenteriae 5 728 IP | 25 |
| Pseudomonas Aeruginosa A 22 IP | >50 |

Compound 12004 was found to be a fairly good inhibiting agent in vitro towards cultures of Koch Bacillus (H37RV strain), the M.I.C. being as follows in Youmans medium:

| | Koch Bacillus (mg.) | |
|---|---|---|
| | 0.1 | 0.01 |
| 6th day | 1.25 | 0.75 |
| 12th day | 1.25 | 0.75 |
| 18th day | 1.25 | 0.75 |

Mycostatic properties were evaluated in vivo as well as in vitro.

A study was made in accordance with the technique of inoculating a Sabouraud medium containing compound 12004 in various concentrations (from 0.5 to 30 mcg. per ml. of solidified medium), along scratches on said medium. Readings were taken after a sojourn of 7 days in an oven at 27° C. The sensitivity of fungi and yeasts towards 12004 was noted.

Table No. 11 indicates the results:

As to compound 12003, the antifungic activity is expressed in mcg./ml. in the following table.

TABLE 12

| | |
|---|---|
| Trich. mentagrophytes 403 | 1.25 |
| Trich. mentagrophytes G 51 | 10 |
| Trich. mentagrop. (mouse) | 10 |
| Epiderm. floccossum E 24 | 10 |
| Cryptococcus neoformans | 10 |
| Epiderm. floccossum 193 IP | 20 |
| Candida albicans 200 IP | 10 |
| Candida albicans No. 2 | 10 |
| Candida tropicalis No. 1 | >30 |
| Candida pseudotropicalis 2 | 30 |
| Candida krusei | 30 |
| Candida para-krusei | 10 |
| Microsporum gypseum D | >30 |
| Microsporum canis E 25 | ≤0.5 |

A study was also carried out on guinea pigs. Groups of four adult albino guinea pigs weighing about 400 g. were used.

Two groups were given *Microsporum canis* E 25 (M.I.C. in vitro=1.25 mcg./ml.) and two other groups *Trichophyton mentagrophytes* 403 (M.I.C. in vitro=1.25 mcg./ml.) percutaneously.

One ml. of a saturated aqueous solution of glucose was added to a 7–10 days' culture of the fungus on Sabouraud agar in a tube. The whole was carefully homogenised by stirring with 1 ml. of honey. On the depilated, slightly scarified flanks of each animal, the contents of a tube were spread with a spatule. Skin lesions (depilation, desquamation, erythema) appeared and spread as soon as the 4th day.

Ten days after inoculation and for seven days, a group of guinea pigs for each fungus was treated by means of a water dispersible cream containing 0.3% of compound 12004.

Each animal received about 1.5 g. of compound 12004 per day. The corresponding group of control animals was treated only with the cream excipient alone. Five days after the beginning of the treatment, the animals infected with *Microsporum canis* and treated with compound 12004 were healed, and recovery was maintained up to the end of the experiment (24 days after inoculation). On the contrary the lesions were propagated in the corresponding control group.

Recovery of animals having received *Trychophyton mentagrophytes* was slower; after 7 days of treatment, one animal out of four still had fungus on lesions, and only after 10 days of treatment, all animals had recovered.

TABLE 11
[Mycostatic activity in vitro of 12004]

| Genus | Number of strains | Number of strains for which the M.I.C. (mcg./ml.) is— | | | | | | | | |
|---|---|---|---|---|---|---|---|---|---|---|
| | | 0.5 | 1.25 | 2.5 | 5 | 10 | 20 | 25 | 30 | 50 |
| Epidermophyton floccosum | 10 | | 2 | 4 | 2 | 1 | 1 | | | |
| Trichophyton mentagrophytes | 13 | | 6 | 4 | 2 | | | | 1 | |
| Trichophyton violaceum | 2 | | 2 | | | | | | | |
| Trichophyton rubrum | 7 | | 4 | | 2 | 1 | | | | |
| Trichophyton interdigitalis | 1 | | | | | 1 | | | | |
| Trichophyton schoenlini | 1 | 1 | | | | | | | | |
| Microsporum canis | 2 | | 1 | | 1 | | | | | |
| Microsporum andonini | 1 | | | 1 | | | | | | |
| Microsporum gypseum | 4 | | | 3 | 1 | | | | | |
| Madurella mycetomi | 1 | | | | 1 | | | | | |
| Streptomyces madurae | 1 | | | | 1 | | | | | |
| Nocardia asteroides | 3 | | | | | 1 | 2 | | | |
| Aspergillus sp. | 9 | | | | 1 | 1 | 4 | 2 | | 1 |
| Penicillium sp. | 3 | | | 1 | 2 | | | | | |
| Allascheria boydii | 1 | | | | 1 | | | | | |
| Candida albicans | 16 | 5 | 9 | 1 | | | | | 1 | |
| Candida krusei | 2 | | 1 | | | 1 | | | | |
| Candida parakrusei | 5 | 1 | 4 | | | | | | | |
| Candida tropicalis | 3 | | | 2 | | | | 1 | | |
| Candida pseudotropicalis | 3 | | | 2 | 1 | | | | | |
| Mycoderma gelanoides | 8 | | | 4 | 2 | | | 1 | 1 | |
| Candida pulcherina | 2 | 1 | 1 | | | | | | | |
| Rhodotorula | 4 | 1 | 1 | | 1 | 1 | | | | |
| Cryptococcus neoformans | 4 | | 2 | 1 | 1 | | | | | |
| Total | 106 | 9 | 41 | 18 | 15 | 8 | 9 | 2 | 3 | 1 |
| Percentage | 100 | 8.4 | 38.6 | 16.9 | 14.1 | 7.4 | 8.4 | 1.8 | 2.8 | 0.9 |

Action on intestine candidiosis in mice

Two groups of 10 mice were given orally a suspension of a 48 hours' culture of *Candida albicans* in salt aqueous solution.

One group was treated three times with compound 12004 in a dose of 100 mg./kg., the other one being employed as a control. A counting was made after the last treatment. The results were as follows:

| Group | Number of colonies per each gram of stools in | |
|---|---|---|
|  | Caecum | Faeces |
| Control | 175 | 11,425 |
| 12004 | 0 | 0 |

In the experimental conditions obtaining, compound 12004 was thus very active against experimental intestinal candidiose in mice.

Finally it has not been possible to detect any antigenic activity for compound 12004. The compound did not seem to cause production of precipitating antibodies; no passive cutaneous anaphylaxis reaction, photosensibilisation or Arthus phenomenon was observed.

As to toxicity (measured in mice according to Miller & Tainter) it is apparent from the following table:

| Administration route | Lethal doses (mg./kg. of body weight) | | |
|---|---|---|---|
|  | $LD_0$ | $LD_{50}$ | $LD_{100}$ |
| Oral | >1,000 |  |  |
| Intraperitoneal | 250 | ca. 500 | ca. 1,000 |

Compound 12003 shows analogous but less marked properties.

Of the various products studied, the following compounds, have been found to be particularly useful:

As products for intestinal antiseptic use: 11062 C.B., 11262 C.B., 11263 C.B., 11139 C.B., 11140 C.B. and 10746 C.B.;

As antifugal substances, especially for external use in mycoses of varying origin: 10933 C.B., 11064 C.B., 11071 C.B. and 11245 C.B.;

As antitubercular substances: 10290 C.B., 11262 C.B., 11263 C.B., 11273 C.B. and 11274 C.B.

Among the products of the invention, the compounds 11062 C.B., 11262 C.B., 11263 C.B., 10933 C.B. and 11071 C.B. may be used in human or veterinary medicine, by local or general application, in infectious conditions in which the bacteria responsible are susceptible to the action of these products (infectious diarrhoea or mycoses of varying origin).

The posology may vary in the region of 5 g. to 3 g. per day.

The materials provided by the invention may be used in the following forms:

(a) TABLETS

Example A

| | Mg. |
|---|---|
| 2-ethylamino-5-5'-nitrofurfurylidene)-thiazoline - 4-one (11062 C.B.) | 200 |
| Lactose | 30 |
| Starch | 30 |
| Magnesium stearate | 6 |
| Talcum | 6 |

Example B

| | Mg. |
|---|---|
| 2-dimethylamino - 5 - [2' - (5'' - nitrofurfurylidene) ethylidene]-thiazoline-4-one (11263 C.B.) | 100 |
| Starch | 100 |
| Colloidal silica | 50 |
| Magnesium stearate | 10 |

(b) OINTMENT

Example C

| | G. |
|---|---|
| 3-methyl-5-(5' - nitrofurfurylidene)-thiazolidine - 2,4-dione (10933 C.B.) | 2 |
| Salicylic acid | 2 |
| Lanoline | 5 |
| Petroleum jelly q.s. to make 100 g. | |

Example D

| | g. |
|---|---|
| 3-isopropyl-5-(5' - nitrofurfurylidene)-thiazolidine - 2,4-dione (11071 C.B.) | 2 |
| Polyethylene glycol ether and tetrahydrofurfuryl alcohol q.s. to make 100 g. | |

Compounds 12004 and 12003, chiefly the former, may be used in human therapeutics and veterinary therapeutics, in particular against mycoses.

For this purpose they may be formulated as above, for example in the form of cream or ointment for the treatment of external mycoses or in tablet or coated pill form for the treatment of enteric or vaginal mycoses.

Example E

Gynecologic tablets:

| | g. |
|---|---|
| 3-β-bromo-ethyl - 5 - (5' - nitrofurfurylidene)-thiazolidine-2,4-dione (12004) | 0.01 |
| Lactose, rice starch, talcum, polyvinylpyrrolidone, magnesium stearate | (1) |

[1] Q.s. for a tablet weighing 1 g.

Example F

Collutory:

| | g. |
|---|---|
| Micronised 12004 | 0.15 |
| 95% ethyl alcohol, glycerol, mono-ammonium glycirrhizine, methylcellulose, sodium saccharinate, anise oil, eugenol, vanilline, purified water | (1) |

[1] Q.s. for 100 ml.

Example G

Ointment:

| | g. |
|---|---|
| 12004 | 0.3 |
| Cetyl alcohol, polyoxyethylene derivative of lanoline and sorbitol, sorbitan monolaurate, polyoxyethylene sorbitan monolaurate, 70% aqueous solution of sorbitol, methyl para-hydroxy benzoate sodium salt, purified water | (1) |

[1] Q.s for 100 g.

Example H

Ointment:

| | g. |
|---|---|
| 12004 | 0.3 |
| Cetyl alcohol, titanic anhydride, glycerol, sodium laurylsulphate, purified water | (1) |

[1] Q.s for 100 g.

Example I

Tablet:

| | g. |
|---|---|
| 12004 | 0.002 |
| Anhydrous citric acid, mint oil, powdered gelatine, monoammonium glycyrrhizine, powdered gum arabic, magnesium stearate, menthol, starch containing, fine powder sugar | (1) |

[1] Q.s. for a 1.1 g. tablet.

I claim:

1. A compound of the formula

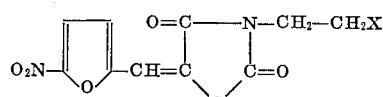

wherein X is selected from the class consisting of Br and Cl.

2. A compound of the formula
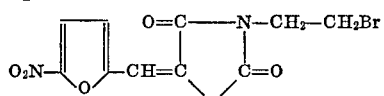
3. A compound of the formula
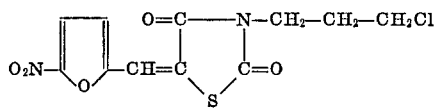
References Cited
Chemical Abstracts, vol. 48, cols. 3343-3344 (1954) (abstract of Sanchez et al.).
Chemical Abstracts, vol. 50, cols. 971-972 (1950).
Chemical Abstracts, vol. 55, cols. 5228 to 5229 (1961).
Chemical Abstracts, vol. 55, subject index, page 1594s (1961).
J. Am. Chem. Soc., vol. 73, pp. 2357-2359 (1951).
Chemical Abstracts, Sixth Collective Index, pages 10238 and 10243 (1964).
JOHN D. RANDOLPH, Primary Examiner
U.S. Cl. X.R.
424—270; 260—306.7, 240.1